(12) United States Patent
Chino et al.

(10) Patent No.: US 6,512,051 B2
(45) Date of Patent: *Jan. 28, 2003

(54) ELASTOMER COMPOSITION

(75) Inventors: Keisuke Chino, Kanagawa (JP); Masahiro Ikawa, Kanagawa (JP); Makoto Ashiura, Kanagawa (JP)

(73) Assignee: The Yokohama Rubber Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,310

(22) Filed: Jan. 21, 1999

(65) Prior Publication Data

US 2002/0086952 A1 Jul. 4, 2002

(30) Foreign Application Priority Data

| Jan. 22, 1998 | (JP) | 10-010192 |
| Apr. 28, 1998 | (JP) | 10-118069 |
| Jun. 16, 1998 | (JP) | 10-168120 |
| Jul. 31, 1998 | (JP) | 10-216990 |
| Oct. 2, 1998 | (JP) | 10-281038 |

(51) Int. Cl.⁷ .............................................. C08F 8/32
(52) U.S. Cl. ...................... 525/203; 525/205; 525/206; 525/207; 525/218; 525/220; 525/221; 525/285; 525/326.7; 525/327.4; 525/327.6; 525/328.2; 525/328.3; 525/340; 525/343; 525/354; 525/355; 525/379; 525/382; 525/384; 525/386

(58) Field of Search .............................. 525/327.6, 203, 525/205, 206, 207, 218, 220, 221, 285, 326.7, 327.4, 328.2, 328.3

(56) References Cited

U.S. PATENT DOCUMENTS 3,435,003 A    3/1969   Craven ........................ 260/47

FOREIGN PATENT DOCUMENTS

| JP | 5-339420 | 12/1993 |
| JP | B-2710263 | 5/1995 |

OTHER PUBLICATIONS

Liquid Crystalline Properties of Ion Complexes built through Polymers Having Amino Groups, (Dept. of Materials Science, Interdisciplinary Faculty of Science and Engineering, Shimaine University, Nishikawatsu, Matsue 690), Seiji Ujiie and Moriyuki Sato (No Date).

Primary Examiner—Bernard Lipman
(74) Attorney, Agent, or Firm—Finnegan, Henderson, Farabow, Garrett & Dunner LLP

(57) ABSTRACT

An elastomer composition including an elastomer having a functional group, and a compound having a functional group, in which corresponding functional groups form a cross-link by at least one of an ionic bond, a hydrogen bond, and Diels-Alder reaction with temperatures, i.e., by heating, while the cross-link is cleaved at around room temperature, forming and cleaving of the cross-link being reversible.

12 Claims, 19 Drawing Sheets

FIG. 1 CARBOXYLIC ACID-MODIFIED LIQUID ISOPRENE RUBBER

ELASTOMER COMPOSITION

BACKGROUND OF THE INVENTION

The present invention relates to elastomer compositions including elastomers having functional groups, and compounds having additional functional groups. More particularly, the present invention pertains to elastomer compositions, in which functional groups of elastomers, and additional functional groups of compounds are capable of forming and cleaving cross-links reversibly with temperatures.

It is known, as described below, that an ionic bond, or a hydrogen bond is used for increasing a molecular weight of a monomer, or of a polymer, as well as modifying, or cross-linking the monomer or the polymer.

It was recently found that, when a polyallylamine and a long-chain alkyl acid are mixed, a salt is formed to generate a thermotropic liquid crystal. It was conceived that this phenomenon may have occurred, since the polyallylamine and the long-chain alkyl acid formed a salt within a range of temperature such that the salt would act as a methogen (Ujiie et al. Liquid crystal forum, 1997).

Onium salts with low molecular weights are widely used for preparation of, such as, an antistatic agent, an antimicrobial agent (JPA-9-111129), a gelling agent (JPB-2700377), a surface active agent (JPA-10-8041), a latent polymerization initiator (JPA-9-328507,JPB-2644301), and an energy ray-sensitive acid generator (JPA-9-202873). Moreover, polymeric compounds having onium salts, or their polymers are widely used for preparation of, such as, a pyridinium salt (JPA-9-324015), an ammonium salt (JPA-10-87741, JPB-2668260), a phosphonium salt-typed antimicrobial agent (JPA-10-81854), a monomer for soap-free polymerization (JPB-2668260), an antistatic agent (JPA-10-7822, JPA-9-328597), a film-forming perspiration-resistant polymer (JPA-10-500711), a water-soluble resin (JPB-2641955), a cross-linked polymeric ammonium salt (JPA-9-5007687), and a cleaner (JPA-9-235369).

However, a thermoplastic elastomer, in which a cross-link is formed by introducing an onium structure into a side chain of the elastomer, is not known. Moreover, an ionomer is known as a polymer having a cross-linked structure caused by a metallic ion.

It is a well-known fact that a hydrogen bond is formed between a carbonyl group and amine, and between pyridine and amine is seen in a biomolecule or the like. Immobilization of functional groups by hydrogen bonds is widely utilized in the ultramolecular-chemistry field, which is developing new functional molecules, such as an ion channel.

Moreover, it is also known that hydrogen bonds are utilized to modify thermoplastic resins. For example, JPA-63-69864 proposes a shape memory resin, which changes its shape by lowering the number of cross-links therein by heating it to over a grass transition point, but restores its original shape by cooling it to below the grass transition point. In JPA-63-69864, it is disclosed as a preferred embodiment that an epoxy compound and an amine curing agent are reacted to form a shape including a number of hydrogen bonds therein.

Furthermore, utilization of hydrogen bonds has been proposed to prevent heat resistance or rigidity from lowering, by adding a compound with a low molecular weight, or a thermoplastic resin with high flowability as a modifier. For example, a compound with a hydroxyl group, and a further compound with a functional group, which may form a hydrogen bond with the hydroxyl group of the former compound, are added into a thermoplastic resin such that flowability and heat resistance of the resin may be improved (JPA-5-339420). For an additional example, a thermoplastic resin, and a compound with a functional group, which may form a hydrogen bond with the following carboxyl group, are added to a styrene based resin having a carboxyl group such that rigidity and flowability of the styrene based resin may be improved (JPA-7-331002).

However, it is not known that a hydrogen bond is utilized for forming a cross-link between an elastomer and a compound.

Forming and cleaving of cross-links are known in polymer resins, but not known in elastomers. In other words, an elastomer having a conjugated diene structure including a heteroatom in its side chain is not known. It is also not known that, after a compound having more than two dienophiles, and an elastomer having a conjugated diene structure in its side chain are once bonded and cross-linked to each other by Diels-Alder reaction, the resultant cross-link is cleaved by heating.

Furthermore, an elastomer having a dienophile structure in its side chain is not known. It is also not known that, after the elastomer is once reacted with a compound having at least two conjugated dienes by Diels-Alder reaction to form a cross-link, which will then be cleaved by heating.

It is known that polyester having a furan moiety in its side chain is capable of cross-linking at 100° C. in the presence of bismaleimide, and capable of cleaving a resultant cross-link at 140° C. (U.S. Pat. No. 3,435,003). Moreover, the following two cases are also known (J. Polym. Sci., Polym. Chem. Ed., 17 (1979) p. 2039, J. Polym. Sci., Polym. Chem. Ed., 17 (1979) p. 2055, U.S. Pat. No. 3,826,760 and U.S. Pat. No. 4,138,441):

After butyl rubber having cyclopentadiene is once cross-linked at room temperature, the butyl rubber will then be dissociated by heating in the presence of maleic anhydride; and after ethylene-propylene rubber is once cross-linked at 150° C., the ethylene-propylene rubber will then be dissociated at 170° C.

Furthermore, it is known that a polymer having an oxazolidine or a furan shows a property of thermal cross-link formation and cleavage, which is capable of forming and cleaving cross-links reversibly with temperatures (Macromolecules, 1990, 23, p. 2636).

It is also known that, after resins having a furan skeleton react with bisdienophile to form a cross-link by Diels-Alder reaction, the cross-link will then be cleaved by heating (Macromolecules, 1998, 31, p. 2636).

Thermoplastic elastomers utilize physical cross-links, contrary to conventional vulcanized rubber having a stable three dimensional structure, in which a polymer and a vulcanizer form a covalent bond. The physical cross-links enable thermoplastic elastomers to be easily molded by the same fusion heating process as is applied to conventional thermoplastic resins. Therefore, it is not necessary that the thermoplastic elastomers employ a complicated vulcanizing and molding process including preforming.

As a typical example of such thermoplastic elastomers, a substance is known, which includes a resin component and a rubber component. At ordinary temperature, the resin component becomes a finely crystallized hard segment, which serves as a cross-link point of a three dimensional network structure. In this case, such hard segment prevents plastic deformation of the rubber component (soft segment) of the thermoplastic elastomers. However, as the temperature rises, the resin component is softened to melt. Then, the plastic deformation of the rubber component is allowed. Examples of such thermoplastic elastomers having a resin component and a rubber component are such as, for example, blockcopolymers such as a styrene-butadiene blockcopolymer, and an isoprene multiblockcopolymer, resin and rubber mixtures such as a mixture of polypropylene and ethylene-propylene dienecopolymer (EPDM). Moreover, a resin and rubber mixture, in which its rubber component (EPDM) is cross-linked by a peroxide, is also known.

Such thermoplastic elastomers, which have been known in the art, include a resin component as a hard segment such that rubber elasticity of the thermoplastic elastomers is undeniably lower than that of conventional vulcanized rubber. Accordingly, if a thermoplastic elastomer not including a resin component as a hard segment comes to be prepared, or, a vulcanized rubber comes to be provided with thermoplasticity properties (flowability), then, though a heat molding process without accompanying a complicated process of kneading, preforming, vulcanizing and the like, a rubber elastic body may simply be prepared. This will have a tremendous industrial advantage.

Though it is theoretically known that a thermoplastic elastomer may be obtained by utilizing a hydrogen bond for forming a cross-link, it is not known that such thermoplastic elastomer is in practical use. In other words, a hydrogen bond has a lower bonding energy than a chemical bond has such that the cross-link of the hydrogen bond is easily cleaved with heat and the like. Therefore, the resinous polymer described above is usually in a solid state at normal temperatures such that cross-linking is not required to solidify the polymer. However, the thermoplastic elastomer is transformed into a solid state by being cross-linked to exhibit rubber elasticity such that the elastomer may not be used in a cross-link mechanism unless it keeps a stable cross-linked state.

As far as rubber compositions for tires are concerned, a means to enhance processability of molding by decreasing viscosity through incorporating liquid polyisoprene rubber into diene based rubber is known (JPB-2727228).

On the other hand, JPB-2710263 discloses a method to enhance road-gripping properties of tires by incorporating liquid polyisoprene rubber having a hydroxyl group, and/or liquid polybutadiene rubber having a hydroxyl group into rubber. Moreover, JPB-2710264 discloses to enhance controllability of driving automotive vehicles safely by improving loss tangent (tanδ).

However, incorporating liquid polyisoprene into tires brought about problems. For example, tires have been lowered in tensile strength and abrasion resistance; the temperature of tires was raised by increased friction with roads since the loss tangent (tanδ) has come to be too large; and the like.

SUMMARY OF THE INVENTION

Accordingly, it is an objective of the present invention to provide an elastomer composition capable of forming and cleaving an ionic bond reversibly with temperatures, while having excellent heat resistance, low cold-flowability, and easy recycleability. Moreover, it is the objective to provide the elastomer composition to be added to adhesives so as to provide excellent heat resistance.

Another objective of the present invention is to provide an elastomer composition capable of forming and cleaving a hydrogen bond reversibly with temperatures, having excellent heat resistance, low cold flowability, and easy recycleability. Moreover, it is the objective to provide the elastomer composition to be added to adhesives so as to provide excellent heat resistance.

Still another objective of the present invention is to provide an elastomer composition capable of undergoing Diels-Alder reaction and reverse Diels-Alder reaction such that the elastomer composition is capable of forming and cleaving a cross-link reversibly with temperatures, having excellent heat resistance, low cold flowability, and easy recycleability. Moreover, it is the objective to provide the elastomer composition to be added to adhesives so as to provide excellent heat resistance.

Still another objective of the present invention is to provide a novel thermoplastic elastomer having a functional group capable of being a donor and an additional functional group capable of being an acceptor in a molecule when a hydrogen bond is formed. Moreover, it is the objective to provide the novel thermoplastic elastomer having a structure capable of forming a self cross-link, forming and cleaving a thermotropical cross-link reversibly, and further forming a stable hydrogen bond, which may substantially stand up to a temperature in actual use such that the thermoplastic elastomer has sufficient rubbery properties for actual use in place of rubber, and shows excellent flowability when heated.

The other objective of the present invention is to provide a rubber composition, which has excellent processability and tensile strength, excellent physical properties such as abrasion resistance, and small loss tangent (tan δ). The rubber composition is particularly preferable for the application of tires and the like of automotive vehicles.

To achieve the above objective, the present invention provides an elastomer composition, in which a functional group of an elastomer, and an additional functional group of a compound are capable of forming and cleaving a cross-link reversibly with temperatures. More particularly, the present invention pertains to an elastomer composition, in which the cross-link is an organic salt structure by an ionic bond. Moreover, the present invention pertains to an elastomer composition, in which the cross-link is a hydrogen bond. Furthermore, the present invention pertains to an elastomer composition, in which the cross-link is formed by Diels-Alder reaction. Still furthermore, the present invention pertains to an elastomer composition, in which the cross-link is intramolecular cross-link. And moreover, the present invention pertains to a rubber composition, which includes the elastomer composition capable of forming an ionic bond, and a solid rubber composition.

Other aspects and advantages of the present invention will become apparent from the following description, taken in conjunction with the accompanying drawings, illustrating by way of example the principles of the invention.

BRIEF DESCRIPTION OF THE DRAWING

The features of the present invention that are believed to be novel are set forth with particularity in the appended claims. The invention, together with objectives and advantages thereof, may best be understood by reference to the following description of the presently preferred embodiments together with the accompanying drawing in which:

DETAILED DESCRIPTION OF THE PREFERRED EMBODIMENTS

Figure 1:
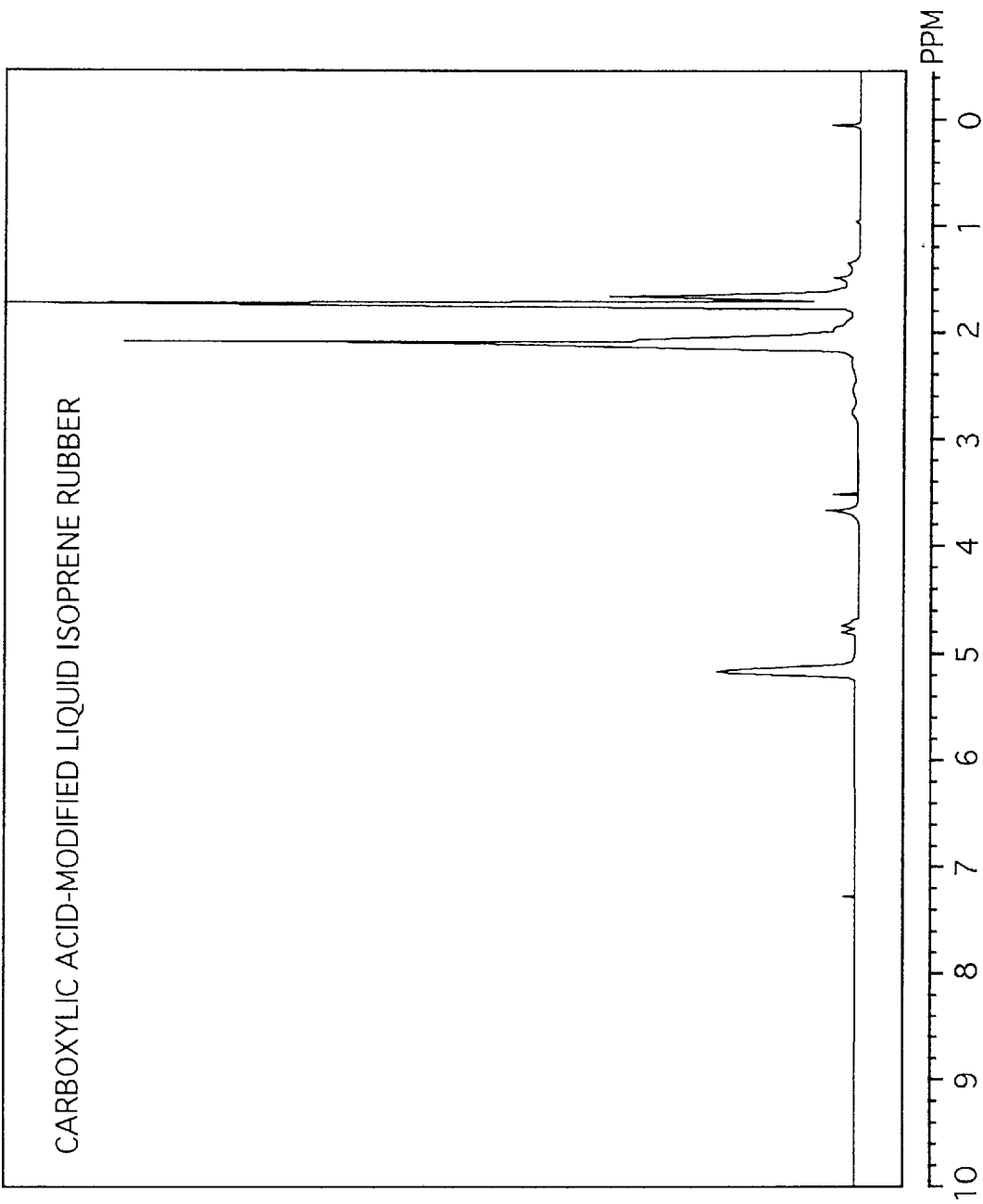
FIG. 1 is a graph showing $^1$H-NMR spectrum of carboxylic acid-modified liquid isoprene rubber (L)

The present invention is an elastomer composition including an elastomer having a functional group, and a compound having an additional functional group. The elastomer composition forms and cleaves a cross-link reversibly with temperatures. Examples of the elastomer compositions are three kinds of elastomer compositions as the first, the second, and the third embodiments, a thermoplastic elastomer having at least two kinds of functional groups therein as the fourth embodiment, and a rubber composition including an elastomer composition having an ionic bond, and solid rubber as the fifth embodiment.

Though depending on the kind of elastomer and compound included in the elastomer composition of the present invention, and also on the type of bonding, the elastomer composition of the present invention is generally cross-linked at lower than 100° C., particularly at around room temperature. When the composition is heated to at least 100° C., particularly to at least 120° C., the composition is generally dissociated to revert to original two components: the elastomer, and the compound.

The first embodiment of the present invention is an elastomer composition including an elastomer capable of forming an organic salt structure, and having a functional group, and a compound having an additional functional group. According to the present invention, the organic salt structure is defined as a structure, which has a tonically bonded moiety between a functional group of a polymer, i.e., a constituent of the elastomer, and the additional functional group of the compound. A metallic ion does not intervene in an ionic bond.

The ionic bond is defined as a bond formed between a cation and an anion by the force of electrostatic attraction. Therefore, the organic salt structure is formed by a non-metallic cation and the anion. A preferable organic salt structure is of an onium salt structure.

Cations to form organic salt structures are not necessarily specific, as far as the cations are non-metallic. They, however, are preferably onium ions. The onium ion is brought about by coordinate-bonding a proton or a cationic reagent to an atom having an unshared pair of electrons. Examples of such onium ions include ammonium ($[R_3NR']^-$, in which R and R' each represent a proton or an additional cation (the same is said hereinafter)), phosphonium ($[R_3PR']^-$), arsonium ($[R_3AsR']^+$), stibonium ($[R_3SbR']^+$), oxonium ($[R_2OR']^-$), sulfonium ($[R_2SR']^+$), selenonium ($[R_2SeR']^+$), stannonium ($[R_2SnR']^+$), and iodonium ($[RIR']^+$). Examples of reaction moieties to generate cations include moieties having an atom including unshared pair of electrons such as an amino group, an imino group and the like.

Anions to form organic salt structures are not necessarily specific. Suitable anions, however, include a halide ion, a carboxylate anion, an alcoholate anion, a phenolate anion, a thiocarboxylate anion, and a sulfonate anion. Reaction moieties to generate anions are not particularly defined. Examples of such moieties include halides (fluorides, chlorides, bromides, iodides, and astatides), a carboxyl group, a hydroxyl group, a phenoxy group, a thiocarboxyl group, a sulfonyl group, and substitutes thereof.

According to the present invention, the organic salt structure may be formed by, though not by any means limited to, combining any one of cations and any one of anions described above properly. However, as described previously, the cation is preferably of the aforementioned onium ion structure, i.e., of onium salt structure, and is more preferably of organic salt structure, which is a combination of an ammonium ion and a carboxylate anion.

According to the present invention, elastomers having a reaction moiety capable of forming an ionic bond are either modified, or synthesized, so as to include a reaction moiety to generate a cation or an anion. Elastomers, which undergo modifications, are such as ordinary elastomers (including liquid rubber), thermoplastic elastomers, and thermosetting elastomers.

Examples of the elastomers include isoprene rubber, butadiene rubber, 1,2-polybutadiene rubber, styrene-butadiene rubber, chloroprene rubber, nitrile rubber, butyl rubber, ethylene-propylene rubber, chlorosulfonated polyethylene, acrylic rubber, epichlorohydrin rubber, polysulfide rubber, silicone rubber, fluorinated rubber, urethane rubber, liquid polyisoprene, liquid polybutadiene, liquid 1,2-polybutadiene, liquid styrene-butadiene rubber, liquid polychloroprene, liquid silicone rubber, liquid fluorinated rubber, and the like.

Examples of the thermoplastic elastomers include styrene based ones (for example, styrene-butadiene-styrene blockcopolymer, styrene-isoprene-styrene blockcopolymer, styrene-ethylenebutylene-styrene blockcopolymer), polyolefin based ones, polyurethane based ones, polyester based ones, polyimide based ones, polyvinyl chloride based ones, and the like.

The thermosetting elastomers are such as urethane based ones, silicone based ones, and the like.

Examples of the modified elastomers having a reaction moiety for generating an anionic ion include liquid isoprene rubber lowly modified with carboxyl groups, liquid isoprene rubber highly modified with carboxyl groups, butadiene rubber having a terminal carboxyl group, nitrile rubber having a terminal carboxyl group, carboxyl-modified polybutene, carboxyl-modified highly reactive polybutene, and ethylene-acrylic acid copolymer and the like. Among above modified elastomers, liquid isoprene rubber lowly modified with carboxyl groups is preferable, since it is highly dependent on temperatures.

A method of synthesizing the aforementioned elastomer having a carboxyl group is now described below, taking diene-based rubber as an example. A mixture of diene-based rubber, e.g., butadiene rubber, and a toluene solution including mercaptoacetic acid is stirred for one hour at room temperature under nitrogen atmosphere. Then the mixture is added to methanol to precipitate. A resultant precipitate is vacuum dried such that diene-based rubber having a carboxyl group is obtained.

An starting elastomer is preferably in a liquid state, since it is easily handled and easily mixed.

A compound having a reactive moiety capable of forming an ionic bond is a compound having a reactive moiety capable of generating a cation or an anion.

The compound having the reactive moiety capable of forming the ionic bond preferably includes a hydrocarbon group in the reactive moiety capable of generating the cation or the anion. Hydrocarbon groups are generally defined as those, which include only carbon and hydrogen. However, according to the present invention, the hydrocarbon groups also include those, which have an oxygen atom, in the form of ether, carbonyl, ester, or the like.

The hydrocarbon groups are alkyl groups, more preferably linear-alkyl groups, and most preferably linear-alkyl groups with a carbon amount of at least 6. The hydrocarbon groups of the type described above each form an ionic bond with a starting elastomer, followed by easily forming a cross-link, with the alkyl group being aligned at room temperature, such that a reaction product having rubber properties may easily be obtained.

As compounds having a moiety capable of generating a cation, primary amines are preferably employed. Moreover, primary amines having a linear-alkyl group, such as, methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, cetylamine, stearylamine, and the like may preferably be employed.

A preferable example of a combination of the starting elastomer and the compound is the combination of carboxyl-modified liquid isoprene rubber and stearylamine.

A mixing ratio of the starting elastomer and the compound in the elastomer composition according to the present invention is preferably 0.1–5 equivalent weights, more preferably 0.5–1.5 equivalent weights, of reactive moiety capable of forming ionic bond in the compound against 1 equivalent weight of reactive moiety capable of forming ionic bond in the starting elastomer. If the former reactive moiety exceeds 5 equivalent weights, or is less than 0.1 equivalent weight, then the amount of the reactive moiety, which does not take part in firming ionic bond, will increase. This lowers efficiency in forming cross-links.

So long as the objective of the present invention is maintained, other additives such as various kinds of stabilizers, flame retardants, antistatic agents, coloring agents, fillers, and the like may well be added during and/or after the preparation of the elastomer composition according to the present invention.

The elastomer composition according to the present invention including the starting elastomer, the compound, and other additives, as the need arises, are kneaded while heating at about 120° C. by such as, though not by any means limited to, a twin screw extruder, a banbury mixer, a kneader, and the like.

A cross-linked elastomer (sometimes called only elastomer hereinafter) according to the present invention has an organic salt structure, i.e., an starting elastomer and a compound combined to one another by an ionic bond. In this organic structure, a cross-link is formed between moieties, which are ionically bonded, at room temperature, and is cleaved at an elevated temperature such as at 100° C. and over (formula 1). The formation of the cross-link structure is confirmed by observing the increase of viscosity (decrease of flowability) The cleavage of the cross-link is confirmed by observing the decrease of viscosity (increase of flowability), or the decrease of hardness. These phenomena, i.e., formation and cleavage of cross-link structures, are reversible, and may be repeatable.

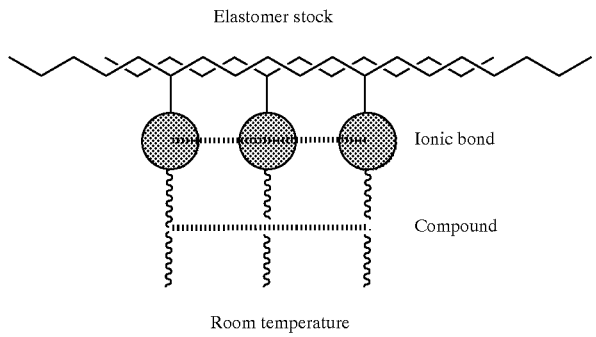

Elastomer stock

Ionic bond

Compound

Room temperature

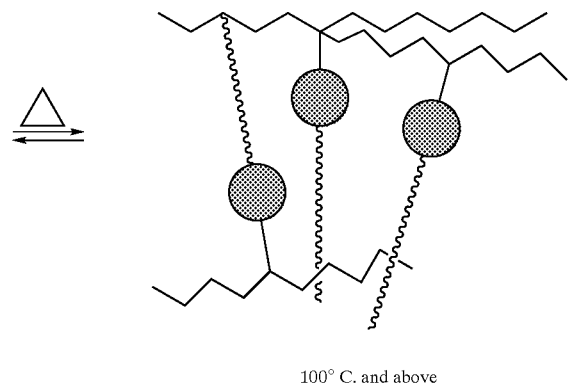

100° C. and above

Since the elastomer according to the present invention forms the cross-link, the elastomer has higher heat resistance and lower cold flowability than the starting elastomer. Moreover, the elastomer composition according to the present invention has large flowability such as at 100° C. and over, and is extremely softened when heated. This enables the elastomer composition to be recycled.

Furthermore, if the elastomer composition according to the present invention is added to resin, or rubber, which exhibits cold flow at room temperature, flow at extrusion, as well as cold flow may be prevented. Therefore, the elastomer composition according to the present invention may be advantageously employed as an anti-flow agent in resin or rubber, and is also useful as a modifier for adhesives.

Furthermore, an adhesive including the elastomer according to the present invention as a modifier is useful since the adhesive has excellent heat resistance. Such adhesives include hotmelt typed ones. The amount of the elastomer according to the present invention employed in the adhesives is preferably 10–90 parts by weight based on 100 parts by weight of the total adhesive weight.

The second embodiment of the present invention is an elastomer composition including an elastomer having a functional group, and a compound having an additional functional group. Those functional groups are capable of forming a hydrogen bond therebetween.

In other words, the elastomer composition according to the present invention includes the elastomer having a reactive moiety capable of forming a hydrogen bond, and the compound having an additional reactive moiety capable of forming a hydrogen bond with the reactive moiety of the elastomer. Accordingly, the hydrogen bond may be formed between the reactive moieties of the elastomer and of the compound in the elastomer composition according to the present invention. The hydrogen bond is formed between a donor and an acceptor. For example, the hydrogen bond is formed by physically combining atoms having high electronegativity to one another by way of a hydrogen atom. In this case, bonding energy is generally about 1–8 kcal/mol, and is lower than that of a chemical bond. The elastomer composition according to the present invention has a combination of the elastomer and the compound, each having either the donor or the acceptor. The reactive moieties of the elastomer and the compound may each be either the donor or the acceptor. Moreover, it is preferable that the elastomer and the compound each have reaction moieties of the donor and the acceptor.

The combination of reactive moieties capable of forming the hydrogen bond is preferably a combination of a hydroxyl group and/or —NHR (R representing a hydrogen atom, an alkyl group, an aryl group, and acyl group) as the donor, and tertiary amine, and/or carbonyl group as the acceptor.

In this case, the donor is defined as an electronegative atom or a substitute having the electronegative atom, which becomes a proton donor. The proton donor forms a partially ionic covalent bond with hydrogen, which forms the hydrogen bond. In this case, the electronegative atoms are such as an oxygen atom, a nitrogen atom, and the like.

Examples of substitutes having such electronegative atoms, i.e., donors, include —OH, —NH—, and preferably an alcohol-based hydroxyl group, a phenol-based hydroxyl group, a hydroxyl group in a carboxyl group of carboxylic acid (including a fatty acid), an amino group, an amido group, and the like.

The acceptor is defined as an electronegative atom or a substitute having the electronegative atom, which becomes a proton acceptor. The proton acceptor forms the hydrogen bond with hydrogen. Examples of the electronegative atoms in the acceptors include a nitrogen atom, an oxygen atom, a sulfur atom, and the like.

Examples of the substitutes having such electronegative atoms, i.e., acceptors, include —CO—, —NR$^1$R$^2$ (R$^1$ and R$^2$ each representing a hydrogen atom, or an alkyl group with a carbon amount of 1–20) including —N=, —COOH, —COOR$^3$ (R$^3$ representing an alkyl or aryl group with a carbon amount of 1–20), —C≡N, —NCO, —SCN, =NOH, —NHCONH$_2$, —CONH, =SO, —CSSH, —SCNH$_2$, —COSH, —CSOH, —SCN, —OP(=O)(OR$^4$)$_2$ (R$^4$ representing a hydrogen atom, a phenyl group, or an alkyl group with a carbon amount of 1–20), a 5-membered or 6-membered ring having a nitrogen atom as a heteroatom, and the like. Examples of 5-membered or 6-membered rings include pyridine, imidazole, triazine, pyrimidine, pyrazine, quinoline, and the like.

An example of a combination of the donor and the acceptor of reactive moieties capable of forming the hydrogen bond in the elastomer composition according to the present invention is preferably a hydroxyl group (including a hydroxyl group in a carboxylic acid), and/or a primary or secondary amino group (including an amido group) as the donor, and a tertiary amino group, and/or a carbonyl group as the acceptor. Such combination shows excellent heat resistance. The combination loses viscosity to a great extent when the hydrogen bond therein is cleaved by heating, while the combination shows low cold flowability when the hydrogen bond therein is formed by cooling, such that the composition according to the present invention is easily recycled.

Illustrative of cross-link systems of hydrogen bonds between the elastomer and the compound in the composition according to the present invention are 2-point hydrogen bonds, 6-point hydrogen bonds, polymer-typed hydrogen bonds, and the like. Following are examples of such illustrations, in which (1) represents a 2-point hydrogen bond; (2) and (3) represent a 6-point hydrogen bond; and (4) represents a polymer-typed hydrogen bond:

(1)
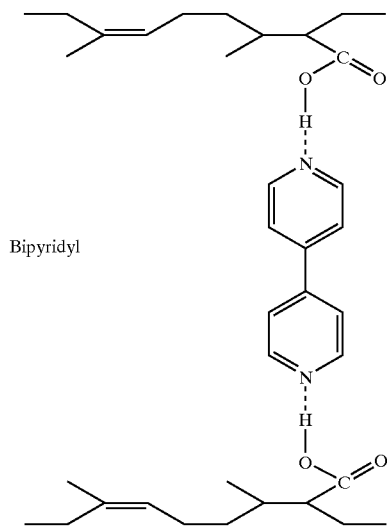
Bipyridyl
(2)
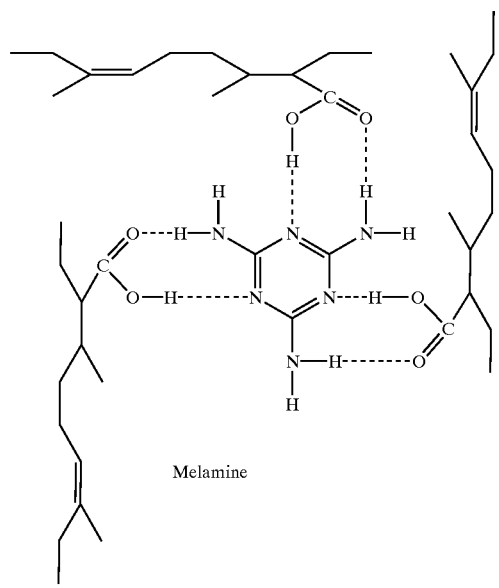
Melamine
(3)
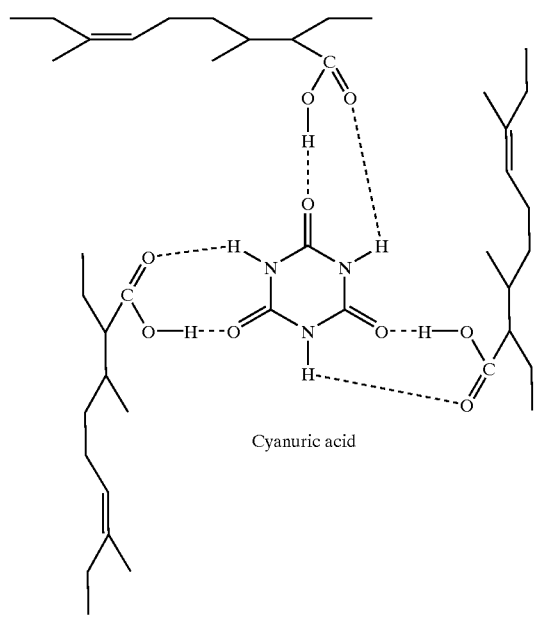
Cyanuric acid
(4)
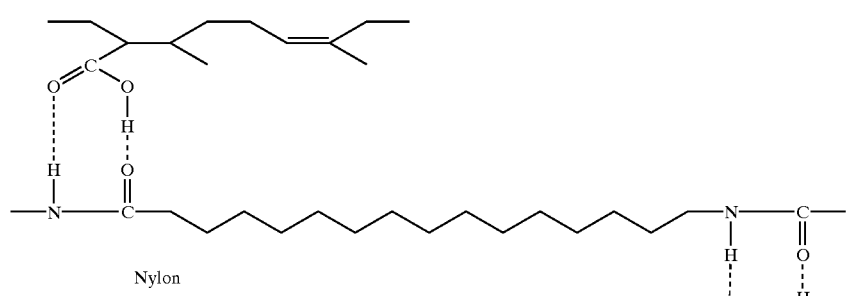
Nylon As the elastomer having reactive moieties capable of forming the hydrogen bond to be used in the present invention, an elastomer modified or synthesized so as to have at least one of described above substituents, which serve as the donor or the acceptor, may be employed. The elastomers to be modified are not necessarily specific, but ordinary elastomers are usable. Examples of such elastomers include ordinary rubber (including liquid rubber), thermoplastic elastomer, thermosetting elastomer, and the like. Examples of such rubber include isoprene rubber, butadiene rubber (BR), 1,2-polybutadiene rubber, styrene-butadiene rubber, chloroprene rubber, nitrite rubber (NBR), butyl rubber, ethylene-propylene rubber, chlorosulfonated polyethylene, acrylic rubber, epichlorohydrin rubber, polysufide rubber, silicone rubber, fluorinated rubber, urethane rubber and the like.

As far as thermoplastic elastomers are concerned, any of the aforementioned ones is usable.

As the elastomer having reactive moieties capable of forming the hydrogen bond, any of modified elastomers having at least one of the aforementioned substitutes serving as the donors is usable. Particularly, liquid isoprene rubber lowly modified with carboxyl groups, liquid isoprene rubber highly modified with carboxyl groups, BR with a terminal carboxyl group, NBR with a terminal carboxyl group, carboxyl-modified polybutene, carboxyl-modified highly reactive polybutene, EMAA resin, EAA resin, and the like are preferable. Among above described chemicals, liquid isoprene rubber highly modified with carboxyl groups is more preferable, since its viscosity is highly dependent on temperatures.

The above elastomers having a carboxyl group may be prepared such as by mixing diene-based rubber such as butadiene, and a toluene solution containing mercaptoacetic acid for one hour at room temperature under nitrogen atmosphere, followed by precipitating a reaction product and then by vacuum-drying a resultant precipitate.

Reactive moieties capable of forming the hydrogen bond are preferably functional groups such as a carboxyl group, which has not only the acceptor, but also the donor therein.

The elastomers having reactive moieties capable of forming the hydrogen bond are available in the market. To name a few, illustrative are:, for example, LIR-403, and LIR-410 (from Kraray Co., Ltd.); CTB, and CTBN (from Ube Inds., Ltd.); CPIB (from Nippon Petrochemicals Co., Ltd.); HRPIB (from laboratory of Nippon Petrochemicals Co., Ltd.); NUCREL (from Du Pont-Mitsui Polychemicals Co., Ltd.); and YUKALON (from Mitsubishi Chemical Corp.).

The starting elastomer is preferably in a liquid state at room temperature, since they are easy to be stirred and handled when the elastomer compositions according to the present invention are prepared. Moreover, the compositions have high viscosity, when hydrogen bonds are formed therein, such that the compositions are excellent in handling as adhesives.

As a compound having the acceptor as the reactive moiety capable of forming the hydrogen bond, any of compounds having at least 2 substitutes, which serve as acceptors, are employable. Particularly, compounds having either of at least 2 donors, at least 2 acceptors, or at least 2 pairs of the donor and the acceptor are more preferable as cross-linking agents. Examples of such compounds include: heterocyclic compounds having no other atoms than at least 2 nitrogen atoms as heteroatoms such as dipyridyl, ethylenedipyridyl, trimethylenedipyridyl, phenazine, purine, pteridine, dipyridylamine, melamine, and the like; compounds having at least 2 carbonyl groups such as quinone, anthraquinone, naphthoquinone, piperazine, and the like; compounds having at least 2 nitrogen atoms and at least 2 carbonyl groups as ring constituents such as cyanuric acid, and the like; compounds having —CO— in an amido group such as nylon 6, nylon 66, nylon 610, nylon 612, and the like; compounds having a nitrogen atom and a carboxyl group as ring constituents such as isonicotinic acid, pyrazinecarbxylic acid, picolinic acid, 3-carbamoyl-pyrazinecarboxylic acid, pyrazinemonocarboxylic acid, phthalic acid, isophthalic acid, telephthalic acid, quinaldinic acid, and the like; urea; aliphatic diols such as ethylene glycol, 1,4-butanediol, pinacol, and the like; aliphatic dicarboxylic acids such as malonic acid, succinic acid, glutaric acid, and the like; amino acids such as glycine, thricin, bicine, alanine, valine, leucine, serine, threonine, lysine, asparagic acid, glutamic acid, cvsteine, methionine, proline, and the like; aliphatic amides such as 5-hydroxyvaleramide, N-acetylethanol amine, N,N'-hexamethylenebisacetamide, malonamide, cycloserine, and the like; phenols such as hydroquinone, biphenol, 4,4'-isopropylidenediphenol, and the like; aromatic alcohols such as 1,4-benzenedimethanol, and the like; aromatic amines such as 4,4'-methylenedianiline, phenylenediamine, and the like; aromatic carboxylic acids such as p-phenylenediacetic acid, p-hydroxybenzoic acid, p-aminobenzoic acid, and the like; aromatic amino acids such as N-(p-aminobenzoyl)-β-alanine, and the like; aromatic esters such as ethyl-m-aminobenzoate, methyl-p-hydroxybenzoate, and the like; aromatic amides such as 4-acetamidophenol, p-acetamidobenzoic acid, and the like; imidazoles such as imidazole, 1,2-dimethylimidazole, 2-benzimadazoleurea, and the like; 5-membered heterocyclic compounds such as pyrrole-2-carboxylic acid, N-methylpyrrole-2-carboxylic acid, pyrazole, 3-methylpyrazole, hystidine, 1,2,4-triazole, and the like; and 6-membered heterocyclic compounds such as 1,2-bis-(4-pyridyl)-ethan, 2 (or 4)-(β-hydroxyethyl)-pyridine, 2 (or 4)-(2-aminoethyl)-pyridine, 2 (or 4)-aminopyridine, 2,6-diaminopyridine, 2-amino-6-hydroxypyridine, 6-azathymine, and the like. Among the above chemicals, dipyridyl, melamine, nylon 6, and cyanuric acid are preferable for the following reasons. Dipyridyl, and melamine each have a pyridyl group in their molecules. Nylon 6 has a carbonyl group in its molecule. Cyanuric acid has a carbonyl group in a pyridyl group therein. These reactive portions each form the hydrogen bond with the elastomer having the reactive moiety capable of forming the hydrogen bond such that dipyridyl, melamine, nylon 6, and cyanuric acid all perform excellent improvements in heat resistance.

Examples of suitable combinations of the elastomer and the compound include combinations between each of liquid isoprene rubber lowly modified with carboxyl groups, liquid isoprene rubber highly modified with carboxyl groups, BR with a terminal carboxyl group, NBR with a terminal carboxyl group, carboxyl-modified polybutene, carboxyl-modified highly reactive polybutene, and each of dipyridyl, melamine, cyanuric acid, and nylon 6. The hydrogen bond is maintained in each of these combinations even if heated up to 80° C. such that each combination is not only superior in heat resistance, but also lower in cold flowability compared with other combinations, which do not include above compounds. Moreover, effective form of hydrogen bond is observed as a phenomenon of viscosity increase, as described in an embodiment below.

A mixing ratio of the compound in the elastomer composition according to the present invention is preferably 0.1–5 equivalent weights, more preferably 0.5–1.5 equivalent weights, against 1 equivalent weight of the reactive portion capable of forming the hydrogen bond in the aforementioned elastomer. If the mixing amount of the compound exceeds 5 equivalent weights, or is less than 0.1 equivalent weight, then the amount of the substitute, which does not take part in forming the hydrogen bond, will increase. This is not preferable, since the viscosity of the composition is increased. If the mixing amount of the compound is less than 0.1 equivalent weight, the hydrogen bond is not effectively formed. This is not preferable, either.

Within the objective of the present invention, other additives such as various kinds of stabilizers, flame retardants, antistatic agents, coloring agents, fillers, and the like, in addition to the aforementioned essential components, may well be mixed to the elastomer compositions according to the present invention.

The elastomer composition according to the present invention including the starting elastomer, the compound, and other additives, as the need arises, are kneaded while heating at about 120° C. by such as, though not by any means limited to, a twin screw extruder, a banbury mixer, a kneader, and the like.

By employing the above constituents, the elastomer compositions according to the present invention form the hydrogen bond at room temperature, and cleave the hydrogen bond by heating. Since temperatures to form, and to cleave hydrogen bonds depend on starting chemicals to be employed, these temperatures may not be generalized. For example, a mixture of liquid rubber having a carboxyl group, and aminotriazole as an additive starts to cleave a cross-link as a temperature increases, and reaches a complete cleavage of the cross-link at 100° C. On the other hand, the mixture starts to form the cross-link as the temperature decreases from 100° C. As the temperature further decreases, cross-link density increases. Then, the mixture completely loses flowability at 50° C. The formation of the hydrogen bond is observed as an increase of viscosity (decrease of flowability). The cleavage of the hydrogen bond is observed as a decrease of viscosity (increase of flowability), or as a decrease of hardness. These phenomena, i.e., formation and cleavage of the hydrogen bond, may repeat many times.

By forming such hydrogen bond, a cross-linked form of the elastomer composition according to the present invention has higher heat resistance and lower cold flowability than the starting elastomer. Moreover, the elastomer according to the present invention has high flowability at 200° C. and over, and is extremely softened when heated. This enables the elastomer composition according to the present invention to be easily recycled.

Accordingly, if the elastomer compositions according to the present invention are mixed to hotmelt type adhesives, the recycleability of the adhesives may be improved.

Furthermore, if the elastomer composition according to the present invention is added to resin, or rubber, which exhibits cold flow at room temperature, flow at extrusion, as well as cold flow may be prevented.

Therefore, the elastomer composition according to the present invention may be advantageously employed as an anti-flow agent in resin or rubber. Furthermore, the elastomer composition according to the present invention may advantageously be employed to adhesives as an elastomer component so as to provide heat resistance.

The third embodiment of the present invention is an elastomer composition including an elastomer having a functional group, and a compound having an additional functional group such that a cross-link structure may be formed from a conjugated diene structrure and a dienophile structure by Diels-Alder reaction.

The elastomer composition according to the present invention includes the starting elastomer, which has one of the conjugated diene and the dienophile structures, and the compound, which has at least 2 of the other ones of the conjugated and the dienophile structures such that a cross-link may be formed between the elastomer and the compound by Diels-Alder reaction.

Examples of the elastomers include an elastomer (C), which is prepared by cross-linking an elastomer (A) having a conjugated diene structure in its side-chain with a compound (B) having at least 2 dienophile structures, and an elastomer (C'), which is prepared by cross-linking an elastomer (A') having a dienophile structure in its side-chain with a compound (B') having at least 2 conjugated diene structures.

The present invention may include an elastomer composition, which contains an elastomer (A) having a conjugated diene structure in its side-chain, and a compound (B) having at least 2 dienophile structures. The elastomer (A) is cross-linked with the compound (B) having at least 2 dienophile structures. The elastomer (A), which is a constituent of the cross-linked elastomer (C), is not necessarily specific. However, the conjugated diene structure of the elastomer (A) preferably includes a heteroatom, and more preferably a furan moiety.

The present invention may include an elastomer composition, which contains not only a reaction product (E) prepared by reacting the compound (B) having at least 2 dienophile structures with a compound (D) having a conjugated diene structure, but also the elastomer (A) having a conjugated diene structure in its side-chain. The elastomer composition maybe cross-linked or dissociated by changing temperatures such that the composition may be freely take a form of composition ((E)+(A)) or of composition ((C)+(D)). The composition ((E)+(A)) is freely interchanged with the composition ((C) (D)) with temperatures. Moreover, in the composition ((C)+(D)), the elastomer (C) may be obtained by removing the elastomer (D) from the composition system.

The present invention may include the elastomer (A), which is prepared by reacting an elastomer having an olefin structure in its main-chain with a furan compound having a mercapto group.

The present invention may include the elastomer (A') having a dienophile structure in its side-chain.

The dienophile structure may preferably have a maleimido moiety.

The present invention may include an elastomer composition, which contains the elastomer (A'), and the compound (B') having at least 2 conjugated diene structures. The elastomer composition ((A')+(B')) may be cross-linked or dissociated by changing temperatures such that the composition may be freely interchanged with the elastomer (C') described below.

The present invention may include an elastomer (C'), which is prepared by cross-linking the elastomer (A') with the compound (B') having at least 2 conjugated diene structures.

The present invention may include an elastomer composition, which contains the elastomer (C') and a compound (D') having a dienophile structure.

The present invention may include an elastomer composition, which contains a reaction product (E') between the compound (B') having at least 2 conjugated diene structures and the compound (D') having a dienophile structure, and the elastomer (A'). The elastomer composition ((E')+(A')) is freely interchangeable with the aforementioned elastomer composition ((C')+(D')) through cross-linking or dissociation with temperatures. Moreover, the elastomer (C') may be obtained by removing the compound (D') from the composition system.

A starting elastomer to be employed in the present invention is the elastomer (A) having a conjugated diene structure in its side-chain, or the elastomer (A') having a dienophile structure in its side-chain. In other words, the elastomer (A) and the elastomer (A') have a conjugated diene structure and a dienophile structure in their side-chains respectively.

The conjugated diene structure may employ, though not by any means limited to, chain conjugated dienes, and cyclic conjugated dienes. Particularly, the cyclic conjugated dienes are preferable because of their excellent heat stability. The conjugated dienes to be employed in the present invention are as follows:

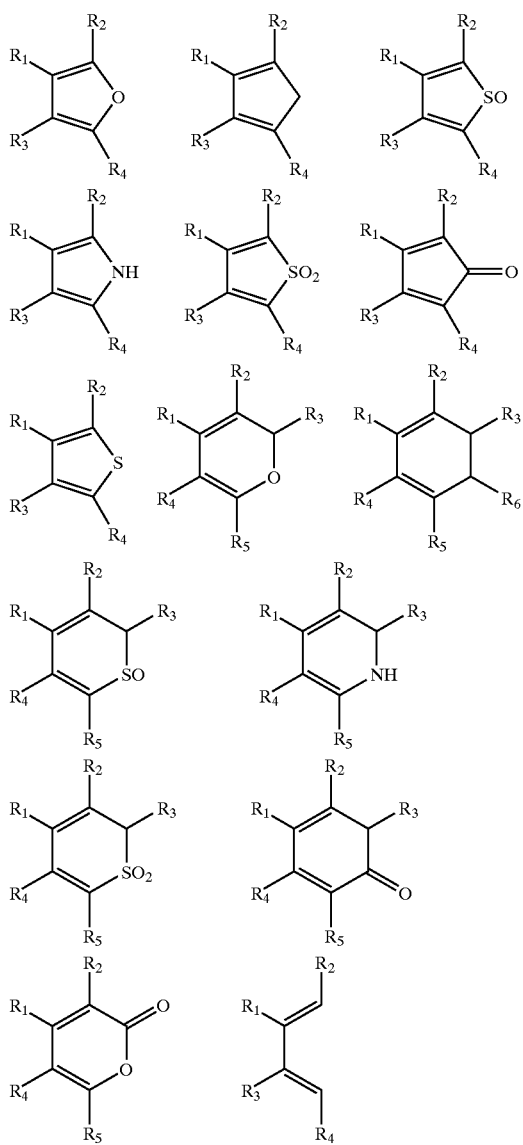

($R^1$ to $R^6$ represent a functional group selected from the group consisting of H, $CH_3$, $C_2H_5$, $C_3H_7$, $C_6H_5$, F, Cl, Br, and I. $R^1$ to $R^6$ may be the same with each other or different from one another.)

Among the above structures, the structures having a heteroatom, particularly having a furan moiety may advantageously be employed.

A dienophile is an unsaturated compound, which will undergo addition reaction with a diene by Diels-Alder reaction to form a cyclic compound. Examples of dienophiles to be employed in the present invention are, though not by any means limited to, as follows:

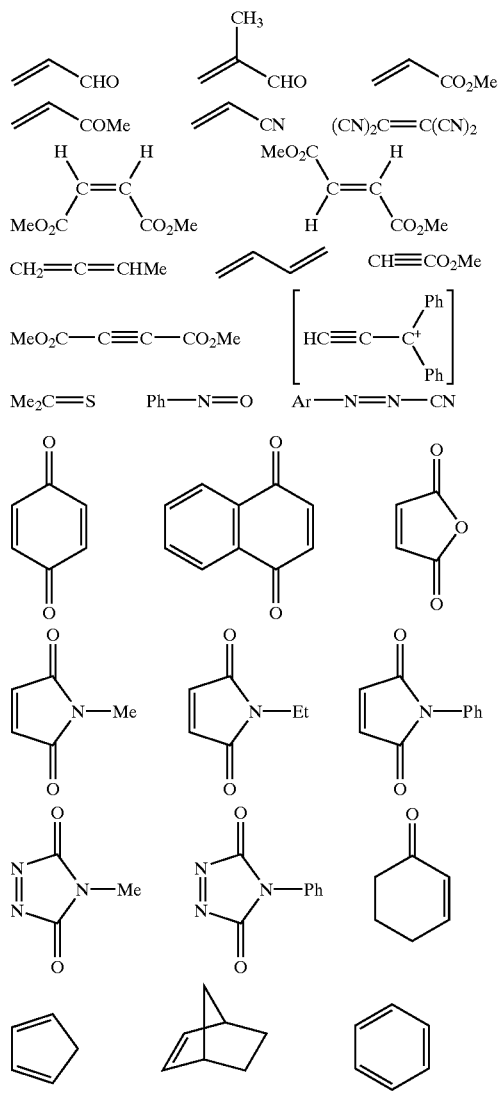

Elastomers combined with the aforementioned conjugated dienes or dienophiles are not necessarily specific. Elastomers having an olefin structure, as well as elastomers not having an olefin structure, are applicable.

Examples of elastomers having an olefin structure in their main chain include natural rubber, butadiene rubber, isoprene rubber, chloroprene rubber, styrene-butadiene rubber, ethylene-propylene diene rubber, acrylonitrile-butadiene rubber, nitrile rubber, butyl rubber, liquid polyisoprene, liquid polybutadiene, liquid styrene-butadiene rubber, liquid polychloroprene, and the like. Examples of the elastosmers without having an olefin in their main chain include 1,2-polybutadiene rubber, ethylene-propylene rubber, chlorosulfonated polyethylene, acrylic rubber, epichlorohydrin rubber, polysulfide rubber, silicone rubber, fluorinated rubber, urethane rubber, liquid 1,2-polybutadiene, liquid silicone rubber, liquid fluorinated rubber, and the like. Among above described chemicals, elastomers having an olefin structure in their main chain are preferable.

Methods of preparing the elastomer (A) and the elastomer (A') are not necessarily specific. For example, as shown in formula 2, the elastomer (A) may be prepared by reacting an elastomer having an olefin structure in its main chain with a furan compound having a mercapto group.

formula 2

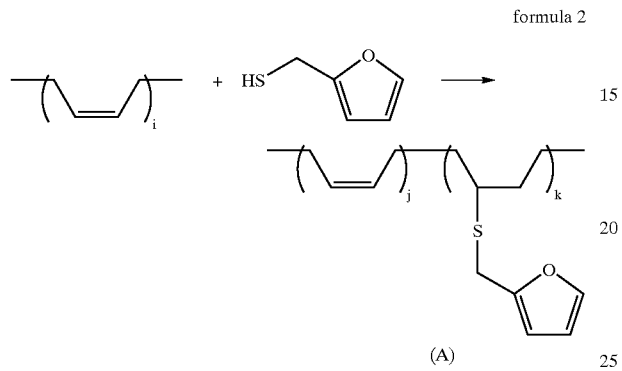

(A)

The present invention may include an elastomer composition, which includes the elastomer (A) and the compound (B) having at least 2 dienophile structures, and an additional elastomer composition, which includes the elastomer (A') and the compound (B') having at least 2 conjugated diene structure.

The dienophile structure of the compound (B) may be replaced by the dienophile structure of the compound (A'), while the conjugated diene structure of the compound (B') may be replaced by the conjugated diene structure of the compound (A).

The compound (B) is not necessarily specific, as long as it is prepared by bonding at least 2 of dienophiles described below to each other, since the compound (B) has at least 2 dienophile structures. The compound may also be a polymer. At least 2 dienophile structures of the compound (B) may be the same with each other or different from each other. Examples of such denophile structures include bisdienophile of such as bismaleimide, and the like, and tridlenophile of such as trimaleimide, and the like. Particularly, 4,4'-bismaleimidodiphenylmethan is advantageously employed.

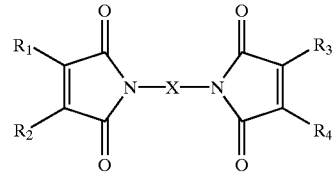

($R^1$ to $R^4$ each represent a functional group selected from the group consisting of H, $CH_3$, $C_2H_5$, $C_3H_7$, F, Cl, Br, and I. $R^1$ to $R^4$ may be the same with each other or different from one another. X is a group selected from the group described below. Letters, p and q, each represent an integer of at least 1.)

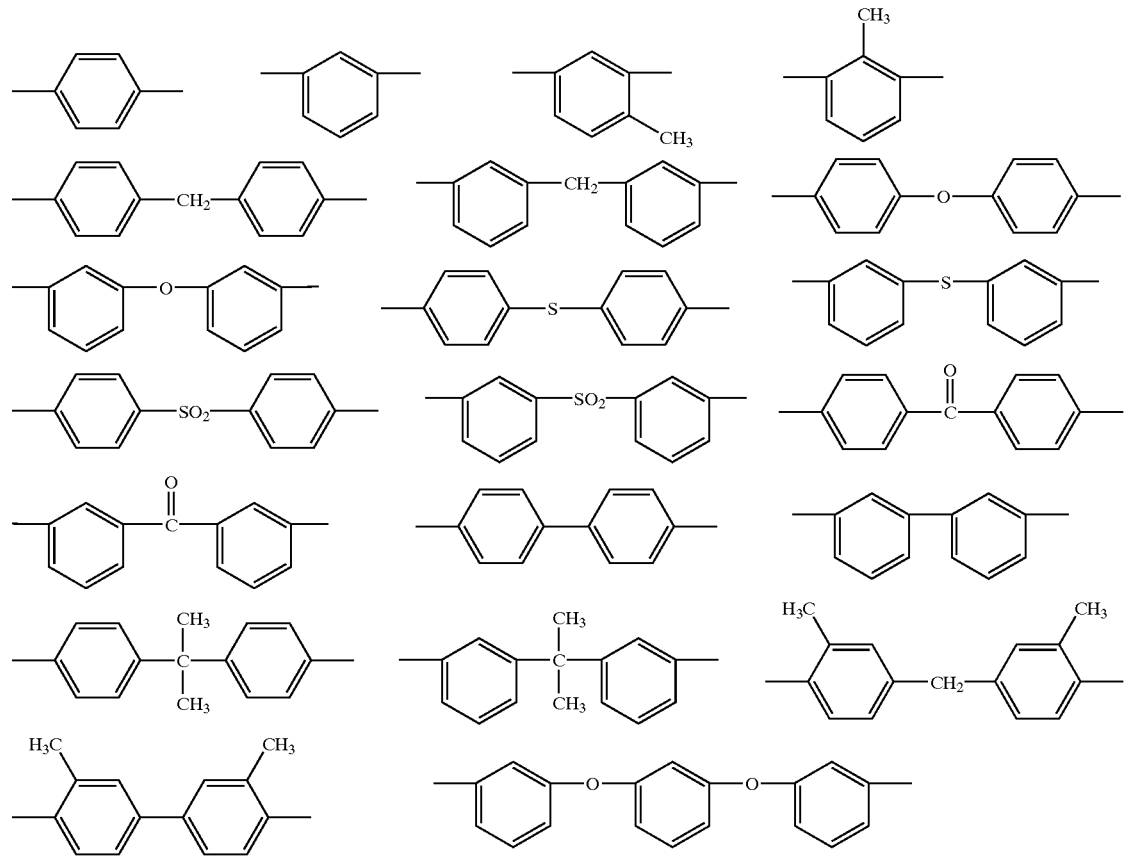

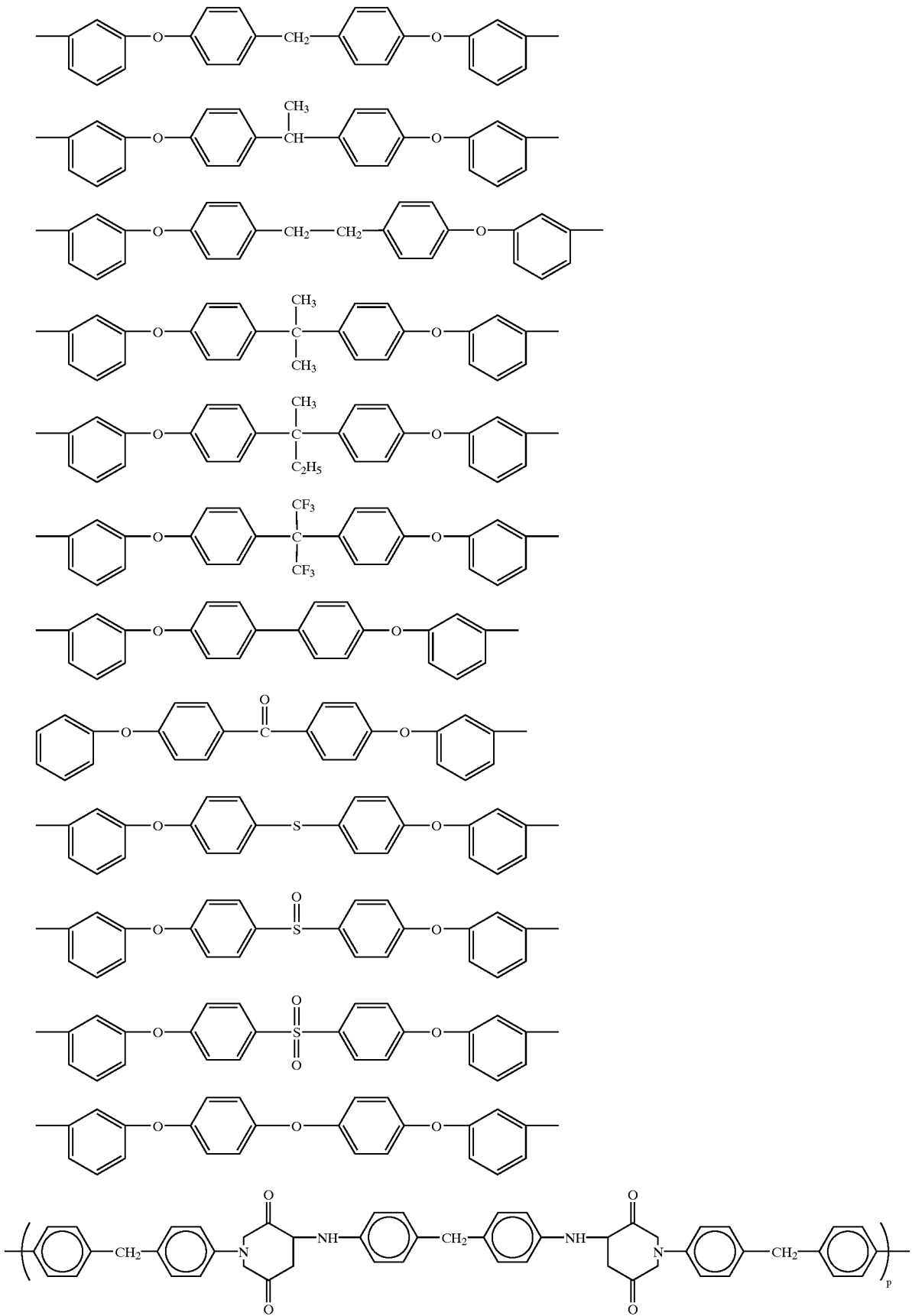

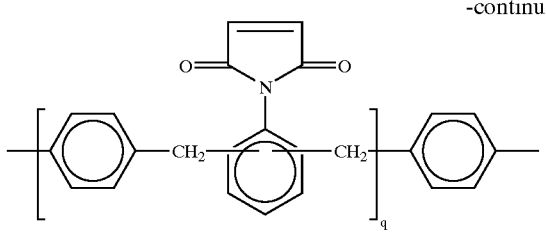

The compound (B') is not necessarily specific, as long as it is prepared by bonding at least 2 of the conjugated dienes described above to each other, since the compound (B') has at least 2 conjugated diene structures. At least 2 of the conjugated diene structures may be the same with each other or different from each other.

Contents of the elastomer (A) and the compound (B), or those of the elastomer (A') and the compound (B') in the aformentioned elastomer composition are determined such that the dienophile structure of the compound (B), or the conjugated diene structure of the compound (B') may be 0.01–1.5 equivalent weights, preferably 0.1–1.0 equivalent weight, with regard to 1 equivalent weight of the conjugated diene structure of the elastomer (A) or the dienophile structure of the elastomer (A') The present invention may also include the elastomer (C) prepared by cross-linking the elastomer (A) with the compound (B), and the elastomer (C') prepared by cross-linking the elastomer (A') with the compound (B').

At the elastomer (C), a conjugated diene structure in a side-chain of the elastomer (A), and a dienophile structure of the compound (B) are bonded by Diels-Alder reaction. As a result, the elastomer (C) is in a form such that the elastomer (A) is cross-linked with the compound (B). The elastomer (C') is in a form such that the elastomer (A') is cross-linked with the compound (B').

A mixing ratio of the elastomer (A) and the compound (B) in the elastomer (c) is determined such that the dienophile structure of the compound (B) has preferably 0.01–1.5 equivalent weights, more preferably 0.1–1.0 equivalent weight, with regard to 1 equivalent weight of the conjugated diene structure in a side-chain of the elastomer (A).

A mixing ratio of the elastomer (A') and the compound (B') in the elastomer (c') is also determined such that the conjugated diene structure of the compound (B') has preferably 0.01–1.5 equivalent weights, more preferably 0.1–1.0 equivalent weight, with regard to 1 equivalent weight of the dienophile in a side-chain of the elastomer (A').

To the elastomer (C), and/or the elastomer (C'), other additives, such as various kinds of stabilizers, flame retardants, antistatic agents, coloring agents, fillers, and the like may be added during and/or after preparation of the elastomers, so long as the scope of the objective of the present invention is maintained.

Moreover, the present invention may include an elastomer composition, which contains the elastomer (C) and the compound (D) having a conjugated diene structure, as well as an elastomer composition, which contains the elastomer (C') and the compound (D') haviang a dienophile structure.

The compound (D) having a conjugated diene structure is not necessarily specific. Compounds having a chain conjugated diene structure or a cyclic conjugated diene structure are applicable. The aforementioned conjugated dienes are advantageously applicable to the compound (D). Such dienes may be the same with or different from that bonded to a side-chain of the elastomer (A), which is a constituent of the elastomer (C). Among dienes, furan, thiophene, cyclohexadiene, and the like are advantageously employed.

Contents of the elastomer (C) and the compound (D) are not specifically defined.

As the compound (D') having a dienophile structure, the aforementioned dienophiles are advantageously employed. Such dienophiles may be the same with or different from that bonded with a side-chain of the elastomer (A'), which is a constituent of the elastomer (C').

A method of preparing the elastomer (C) is not necessarily specific. For example, the elastomer (A), the compound (B), and other additives, if the need arises, are kneaded by such as, though not by any means limited to, a twin screw extruder, a banbury mixer, or a kneader under an elevated temperature. The elastomer (C') may be prepared in a similar way as described above.

Temperatures to form cross-links are not necessarily specific. The cross-link is formed, for example, though not by any means limited to, between the elastomer having the furan moiety, and bismaleimide at 50–100° C. Temperatures to cross-link and dissociate the elastomer (C) are not necessarily specific. However, if the elastomer having the furan moiety, and bismaleimide are employed, the temperature is preferably 100–180° C., and more preferably 130±10° C.

The cross-link reaction, which takes place during a kneading operation under an elevated temperature, is shown in the following formula (3):

$$(A)+(B) \rightarrow (C) \tag{3}$$

Diels-Alder reaction illustrated in the formula (3) is reversible. The elastomer (C), which is a cross-linked substance, undergoes a reverse (retro) Diels-Alder reaction to cleave a cross-link (open a cross-link) into the elastomer (A) and the compound (B), as shown in the following formula (4):

$$(A)+(B) \leftarrow (C) \tag{4}$$

When an elastomer composition including the elastomer (C), and the compound (D) having a conjugated diene structure is kneaded under an elevated temperature, the composition may be dissociated to a composition including a reaction product (E) between the compound (B) and the compound (D), and the elastomer (A), as shown in the following formula (5):

$$(C)+(D) \rightarrow (E)+(A) \tag{5}$$

On the other hand, when a composition including the reaction product (E) and the elastomer (A) is kneaded under an elevated temperature, a cross-link reaction occurs to bring about an elastomer composition including the elastomer (C) and the compound (D) having a conjugated diene structure, as shown in the following formula (6)

$$(C)+(D) \leftarrow (E)+(A) \tag{6}$$

The reactions shown in formulas (5) and (6) may be allowed under solvents such as toluene, if the need arises.

Examples of formula (3), (4), (5), and (6), as well as X are shown in the following formula (7):

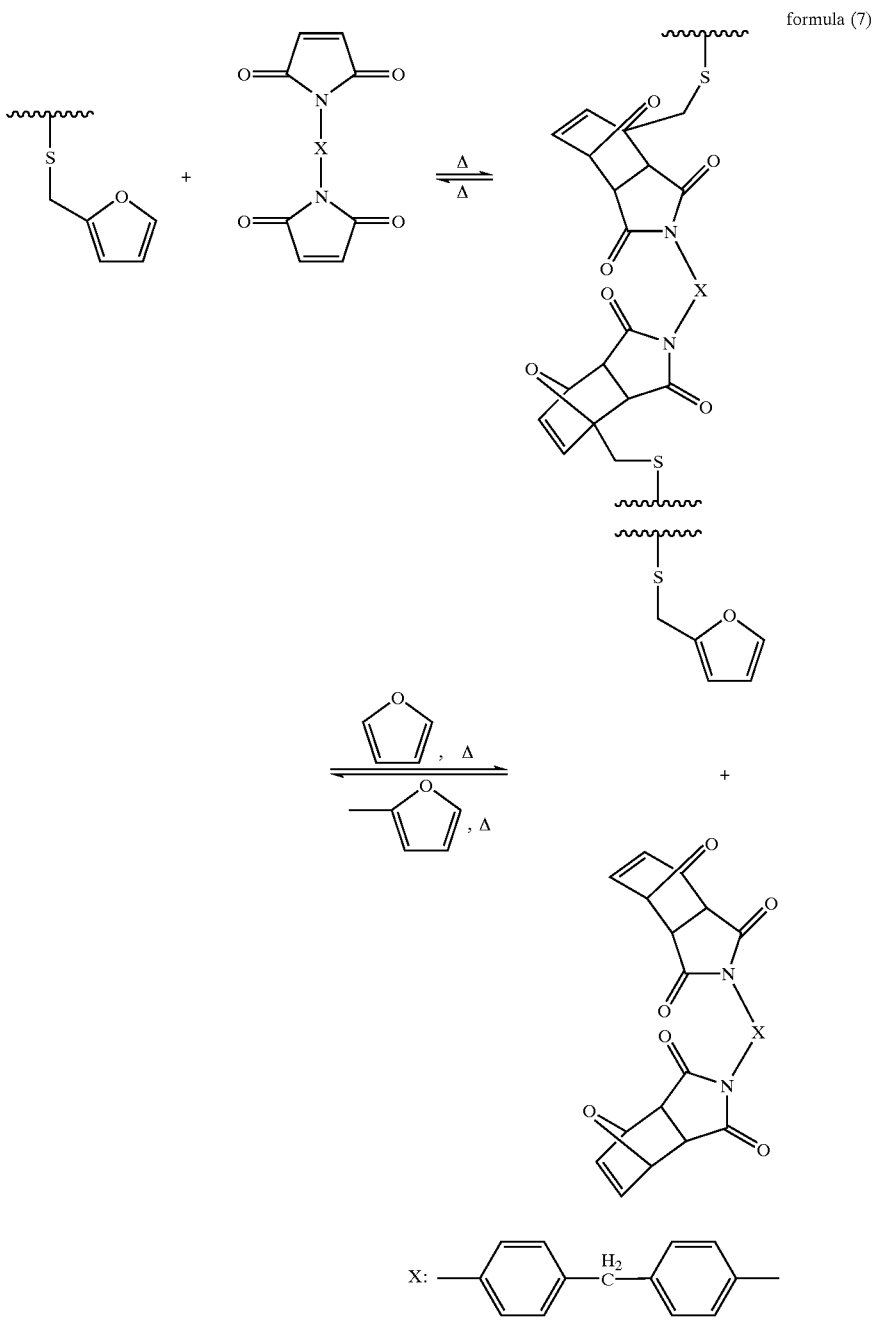

formula (7)

In the reaction shown in formulas (3)–(6) and (7), the elastomer (C) has been employed as an elastomer having a cross-link formed between a conjugated diene structure and a dienophile structure by Diels-Alder reaction. The similar reactions may occur with the elastomer (C').

Reaction rate of the reactions (5) and (6) is higher than that of the reactions (3) and (4) If the elastomer (c) is used together with the compound (D), formation and cleavage of a cross-link structure may be prompted. The similar reactions may occur with the elastomer (C') and the compound (D').

A fourth embodiment of the present invention is an elastomer composition having at least 2 functional groups capable of forming and cleaving a hydrogen bond reversibly with temperatures within a molecule. Therefore, the elastomer composition is thermoplastic.

The thermoplastic elastomer comprises preferably an elastomeric polymer including a functional group having a carbonyl group (i), and an additional functional group having a hetero cyclic amine (ii) in a side-chain thereof. The thermoplastic elastomer is characterized by capability of forming a hydrogen bond therein. The functional group having a carbonyl group (i) is preferably derived from a cyclic anhydride. The functional group having a hetero cyclic amine (ii) is preferably bonded with the elastomeric polymer by way of the functional group having a carbonyl group (i).

It is preferable that the functional group having a carbonyl group (i) is substantially at least one of amide, ester, imido, and carboxyl groups.

The thermoplastic elastomer according to the present invention has preferably at least one of the following functional groups as a side-chain thereof:

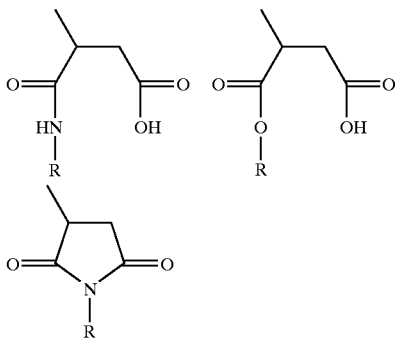

(R represents a hetero cyclic amine.)

The thermoplastic elastomer as described above may be prepared by, for example, reacting the cyclic anhydride group (i) with a compound having a hetero cyclic amine at a temperature, which allows the compound having the hetero cyclic amine to be chemically bonded with the cyclic anhydride group (i).

The thermoplastic elastomer comprises an elastomer, which includes a group having a carbonyl group (i) capable of forming a hydrogen bond, and a group having a hetero cyclic amine (ii) in a side-chain (including a chain end) thereof.

In this case, the group having a carbonyl group (i) and the group having hetero cyclic amine (ii) included in the side-chain of the elastomer are chemically and stably bonded by way of a covalent bond to an atom (generally being a carbon atom), which constitutes a main-chain of the elastomer.

An elastomer, which constitutes the main-chain, according to the present invention is a known substance of a natural polymer or of a synthetic polymer, which is generally known as a rubber elastic material for vulcanization (cross-linking, or curing). Such rubber elastic materials were described above as rubber.

Moreover, the elastomer may be a thermoplastic elastomer having a resin component (TPE), such as polystyrene-based TPE (SBS, SIS, or SEBS), polyolefin-based TPE, polyvinyl chloride-based TPE, polyurethane-based TPE, polyester-based TPE, polyamide-based TPE, or the like.

Such elastomers may be in a liquid state or in a solid state. Their molecular weights may be selected, thought not by any means limited to, in accordance with applications, cross-link densities, or the like. The elastomers are preferably liquid rubber from the reasons that the thermoplastic elastomers are easily handled when they are prepared, and also that they flow when they are heated (dissociated). Therefore, the molecular weights of the elastomers are preferably those that allow the elastomers to be in a liquid state. For example, the weight-average molecular weight of diene-based rubber such as isoprene rubber, or butadiene rubber is preferably about 1000–500000, and more preferably about 1000–100000.

The group having a carbonyl group (i) bonded to a side-chain of the aforementioned elastomers according to the present invention has a hydrogen bond-forming character, and is substantilly a carbonyl group, a carboxyl group, an amide group, an ester group, and imido group, or the like.

Compounds, which are capable of introducing such groups, are such as, though not by any means limited to, a carboxylic acids, and their derivatives.

Examples of carboxylic acids include those having a hydrocarbon group, such as saturated or unsaturated aliphatic, alicyclic, or aromatic group. Whereas examples of derivatives of carboxylic acids include carboxylic acid anhydrides, esters, ketones, amino acids, amides, imides, thiocarboxylic acids (carboxylic acids having a mercapto group), and the like.

Examples of carboxylic acids and their derivatives substantially include carboxylic acids and their derivatives: malonic acid, maleic acid, succinic acid, glutaric acid, phthalic acid, isophthalic acid, telephthalic acid, p-phenylenediacetic acid, p-hydroxybenzoic acid, p-aminobenzoic acid, mercaptoacetic acid, and the like; acid anhydrides: succinic anhydride, maleic anhydride, glutaric anhydride, phthalic anhydride, propionic anhydride, benzoic anhydride, and the like; aliphatic esters: maleate, malonate, succinate, glutarate, ethylacetate, and the like; aromatic esters: phthalate, isophthalate, telephthalate, ethyl-m-aminobenzoate, methyl-p-hydroxybenzoate, and the like; ketones: quinone, anthraquinone, naphthoquinone, and the like; amino acids: glycine, thricin, bicine, alanine, valine, leucine, serine, threonine, lysine, aspargic acid, glutamic acid, cysteine, methionine, proline, N-(p-aminobenzoyl)-β-alanine, and the like; amides: maleinamide, maleinamic acid (maleinic acid monoamide), succinamic acid (succinic acid monoamide), 5-hydroxyvaleramide, N-acetylethanolamine, N,N'-hexamethylenebisacetamide, malonamide, cycloserine, 4-acetamidophenol, p-acetamidobenzoic acid, and the like; imides: maleinimide, succinimide, and the like.

A group having a hetero cyclic amine group (ii) is introduced by a nitrogen-containing heterocycle or a compound having the heterocycle. The nitrogen-containing heterocycle may have a structure, which includes or generates an amino group capable of forming a hydrogen bond in the heterocycle. Examples of such nitrogen-containing heterocycles include such as pyrrole, hystidine, imidazole, triazolidine, triazole, triazine, pyridine, pyrimidine, pyrazine, indole, quinoline, purine, phenazine, pteridine, melamine, and the like. The nitrogen-containing heterocycles may include an another heteroatom in their cycles.

The nitrogen-containing compounds are not necessarily specific, as far as they have a heterocyclic moiety. They may, for example, contain a group capable of forming a chemical bond (covalent bond) with a carbon atom of a main-chain of the polymer. Examples of the group include an amino group, a hydroxyl group, a methylene group, an ethylene group, a carboxyl group, and the like.

Examples of compounds including such nitrogen-containing groups include dipyridyl, ethylenedipyridyl, trimethylenedipyridyl, dipyridylamine, 1,2-dimethylimidazole, 2-benzimadazolurea, pyrrole-2-carboxylic acid, 3-methylpyrazole, pyridine, 2 (or 4)-(2-aminoethyl)-pyridine, 2 (or 4)-aminopyridine, 2,6-diaminopyridine, 2-amino-6-hydroxypyridine, 6-azathymine, acetoguanamin, benzoguanamin, citrazinic acid, 1,2,4-triazole, 3-amino-1,2,4-triazole, 3-aminomethyl-1,2,4-triazole, 3-methylamino-1,2,4-triazole, 3-methylol-1,2,4-triazole, 3-hydroxy-1,2,4-triazole, 2-hydroxytriazine, 2-aminotriazine, 2-hydroxy-5-methyltriazine, 2-amino-5-methyltriazine, 2-hydroxypyrimidine, 2-aminopyrimidine, 2-aminopyrazine, 2-hydroxypyrazine, 6-aminopurine, 6-hydroxypurine, and the like.

The thermoplastic elastomer according to the present invention has a group having a carbonyl group (i), and a group having a cyclic amine (ii) in a side-chain thereof in one molecule. The group (i), and the group (ii) are each bonded chemically to a side-chain of the elastomer in a stable state as described above. The above two kinds of groups, i.e., (i) and (ii), may be independently bonded to a main-chain of the polymer as corresponding side-chains individually, or bonded as a side-chain formed by combining (i) and (ii) to one another. In the latter case, the groups, i.e., (i) and (ii), are chemically bonded not only to the main-chain of the polymer, but also to each other. The groups (i) and (ii) may be bonded by way of some other goups.

An illustrative example of the thermoplastic elastomer, to the main-chain of which the groups (i) and (ii) are independently bonded, will be provided below. In this case, a carboxyl group (ii) and 1,2,4-triazole (iii) are independently bonded to side-chains of isoprene rubber. The resultant thermoplastic elastomer (5) is schematically shown below:

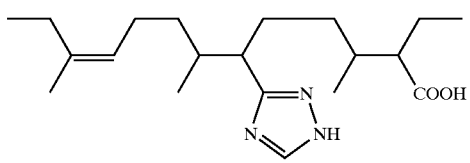

(5)

An illustrative example of the thermoplastic elastomer, to the main-chain of which a side-chain is formed by combining the group (i) and the group (ii) to one another, will be provided below. In this case, an elastomer is isoprene rubber; the group (i) is a group having a carbonyl group derived from maleic anhydride; and the group (ii) is hetero cyclic amine derived from 3-amino-1,2,4-triazole. The resultant thermoplastic elastomer (6) is schematically shown below:

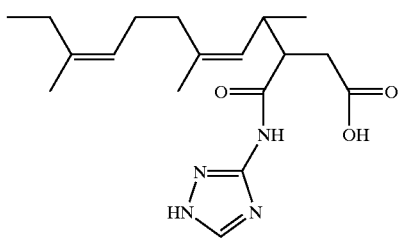

(6)

The thermoplastic elastomer (6) has a branched side-chain comprising a group including an amido bond, which is formed by opening a ring of maleic anhydride through a reaction between 3-amino-1,2,4-triazole and maleic anhydride, and a carboxyl group.

According to the present invention, as the group having a carbonyl group (i), groups derived from cyclic anhydrides such as succinic anhydride, maleic anhydride, glutaric anhydride, and phthalic anhydride are preferable. Among the above cyclic anhydrides, maleic anhydride is particularly preferable.

Moreover, as the group having a hetero cyclic amine (ii), a heterocyclic ring having at least 2 nitrogen atoms in a moiety thereof is preferable. However, a heterocyclic ring having at least 3 nitrogen atoms is more preferable. And a group derived from a triazole ring is most preferable. Examples of the groups having a cyclic amine include preferably groups derived from 3-amino-1,2,4-triazole, 3-hydroxy-1,2,4-triazole, 3-aminomethyl-1,2,4-triazole, 3-methylamino-1,2,4-triazole, 3-methylol-1,2,4-triazole, and the like.

As shown in the thermoplastic elastomer (6), it is preferable that the hetero cyclic amine is bonded to the main-chain by way of a carbonyl group as a side-chain.

In the above structure, in which the group having a carbonyl group (i), and the group having hetero cyclic amine (ii) form a side-chain, either at least one of amido, ester, and imido bonds, or at least one of the above bonds, together with a carboxyl group is preferably formed between the group having hetero cyclic amine (ii) and a carbonyl group of the group (i).

Particularly, a side-chain formed by bonding a cyclic anhydride and a group having a hetero cyclic amine (ii) includes a carboxyl group, as well as one of amido, ester, and imido bonds. Examples of side-chains having such bonds were described above.

Examples of hetero cyclic amine, thought not by any means limited to, as follows:

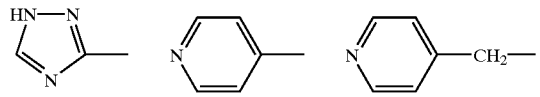

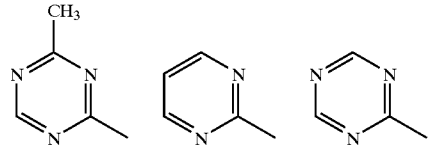

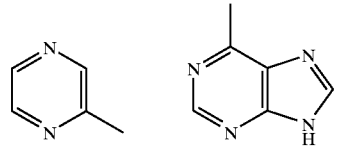

Moreover, if the group having a carbonyl group (i) is derived from a cyclic anhydride, and/or the group having a hetero cyclic amine is derived from a triazole compound, it is preferable that these groups are independently bonded to the main-chain of the thermoplastic elastomer.

Such thermoplastic elastomer according to the present invention described above may perform a self-cross-linking by forming a hydrogen bond. At forming the hydrogen bond, the group having a carbonyl group (i) and the group having a hetero cyclic amine (ii) may each act as either a donor (proton donor) or an acceptor (proton acceptor). However, since an amine in the heterocyclic ring acts as the acceptor, the group having a hetero cyclic amine (ii) generally forms the hydrogen bond with an OH (donor) of the carboxyl group (i). A main-chain of the elastomer, which has such group (i) or a side-chain including such group (i), may further be related with forming an additional hydrogen bond.

If the hydrogen bond is indicated as (donor)—H . . . (acceptor), hydrogen bonds such as O—H . . . O, N—H . . . O, O—H . . . N, N—H . . . N are possibly formed in a thermoplastic elastomer including the group having a carbonyl group (i) and the group having a hetero cyclic amine (ii). Such hydrogen bonds may be formed within a molecule or between molecules. For example, an amino group of the hetero cyclic amine (ii) and a carboxyl group, which constitutes another side-chain, in the thermoplastic elastomer having the structure (6) as shown above are thought to form the hydrogen bond.

The hydrogen bond formed in such thermoplastic elastomer, which includes a group having a carbonyl group (i) and a group having a hetero cyclic amine (ii), is thermotropical such that a cross-link is formed at ordinary temperature and cleaved at high temperature, the latter enabling the elastomer to have flowability. Moreover, since formation and cleavage of the cross-link may be repeated with temperatures, the thermoplastic elastomer according to the present invention may easily utilize recyclability, i.e., the formation and cleavage of the cross-link, which conventional rubber chemically vulcanized with such as peroxides has not been possible to utilize actually. Furthermore, cold-flowability of the elastomer may be prevented by utilizing the cross-link.

Furthermore, if the thermoplastic elastomer employs particular groups (i) and (ii) as its side-chain, the cross-linking amount will be higher. Therefore, the cross-linked elastomer will exhibit excellent heat resistance, while keeping a stable hydrogen bond when the cross-linked elastomer is used. In other words, the hydrogen bond is maintained up to the temperature as high as the elastomer may endure. For example, in the thermoplastic elastomer as shown in the formula (6), cleavage temperature of the hydrogen bond is over 100° C. such that the hydrogen bond is stably maintained at ordinary temperature. The effective formation of the hydrogen bond is confirmed by observing the gelling phenomenon (viscosity increase) of the elastomer. On the other hand, cleavage of the hydrogen bond is confirmed by observing a decrease of its viscosity, and/or an increase of its flowability, and/or a decrease of its hardness.

Moreover, if the thermoplastic elastomer according to the present invention includes the specified groups (i) and (ii), a large curability change is brought about when the hydrogen bond is formed, while a large viscosity decrease is brought about when the cross-link is cleaved. These large changes between liquid and solid phases enable the thermoplastic elastomer according to the present invention to be an excellent recyclable substance. In other words, the elastomer comes to have an extremely low viscosity at a temperature higher than the elastomer can endure. Accordingly, the flowability comes to be extremely large over 130° C. such that the elastomer may be easily recycled.

Advantages of the elastomer according to the present invention will be exhibited when the elastomer includes the group having a carbonyl group (i) and the group having a hetero cyclic amine (ii) therein. Particularly, it is considered that the hetero cyclic amine forms the hydrogen bond more easily than an amine, which is not a constituent of a ring structure. Moreover, if the group having a hetero cyclic amine (ii) is replaced by a group derived from an amino compound with a structure differnt from a heterocyclic ring, the hydrogen bonding strength is weak such that the elastomer stays in a liquid state.

Moreover, the thermoplastic elastomer according to the present invention exhibits more clearly characteristics inherent to elastomers than other thermoplastic elastomers, which have conventional thermoplastic resins as a hard segment. By selecting a proper cross-link density through the use of the specified groups (i) and (ii), the thermoplastic elastomer according to the present invention may exhibit good mechanical strength and rubber elasticity comparable to those of conventional rubber chemically vulcanized with such as peroxides.

The cross-link density differs according to such as purposes of uses, applications, molecular weights of the main-chains, and the like. However, the cross-link density may preferably be determined such that the elastomer shows good rubber elasticity and excellent mechanical strength after a cross-link has occurred. For example, if conjugated diene rubber such as isoprene or butadiene is used as a main-chain, side-chains of the groups (i) and (ii) are each preferably 1–30% by weight, and more preferably 1–10% by weight. The mole ratio of the group (i) to the group (ii) may generally be about 0.5–2.

A method of preparing such thermoplastic elastomer as described above according to the present invention is not necessarily specific, as far as the elastomer has the above specified groups (i) and (ii) in its side-chain.

For example, when the elastomeric polymer is prepared, a monomer, which will form a main-chain of the polymer, and a comonomer, which will introduce the above-described groups (i) and (ii), are copolymerized. This directly brings about a thermoplastic elastomer having groups (i) and (ii) as its side-chains. As another case, a main-chain (elastomeric polymer) is prepared in advance such as by polymerization. Then the main-chain may be modified by a compound, which is capable of introducing the groups (i) and (ii), through graft copolymerization.

The thermoplastic elastomer according to the present invention, which has the groups (i) and (ii) in a side-chain, may be prepared such as by reacting an elastomer, which is modified with the group (i), with a compound, which is capable of introducing the group (ii). In the elastomer, the groups (i) and (ii) are combined in alignment to one another.

A modified elastomer including the group having a carbonyl group (i) may be prepared such as by mixing a diene rubber, for example, butadiene rubber or the like, and a toluene solution containing mercaptoacetic acid for one hour at a room temperature under nitrogen atmosphere, and then by precipitating the resultant reaction mixture in methanol, and finally by vacuum-drying a precipitated substance.

Such modified elastomers are available in the market as commercial products as described above.

Moreover, a compound capable of introducing the group (i) and another compound capable of introducing the group (ii) are first combined to one another. Then a combined compound may secondly be combined with a side-chain of the elastomer.

In each preparation method of the elastomer, whether each group of a side-chain of the elastomer is combined to the main-chain independently or in a form combined with another group may be confirmed by an ordinary analysis method such as NMR spectrum analysis, or the like.

In the present invention, it is preferable that the groups (i) and (ii) are combined to a side-chain of an elastomeric polymer (main-chain), which was prepared in advance. Particularly, it is more preferable that a modified elastomer having a cyclic anhydride group as a side-chain, and a compound having a hetero cyclic amine are reacted at a temperature, at which the compound having a hetero cyclic amine is capable of chemically combining with the cyclic anhydride group. At this reaction, acid anhydride may open its ring.

A temperature, at which a compound having a hetero cyclic amine may perform combination, is dependent on the type of the compound, but is generally between about room temperature and 150° C. For example, if a reaction between isoprene rubber modified with maleic anhydride, and 3-amino-1,2,4-tirazole as a compound having a hetero cyclic amine occurs at about 120° C., maleic anhydride and 3-amino-1,2,4-tirazole are chemically combined to form a side-chain having a amido bond as described in the aforementioned chemical formula (5). In this case, if a carboxyl group instead of a carbonyl group is employed, 3-amino-1, 2,4-triazole can form a hydrogen bond with each of the carboxyl group and the main-chain of the elastomer even at same temperature, but are difficult to be chemically combined to one another. Reaction time is generally about 3–5 hours.

Thermoplastic elastomers described above according to the present invention may find many applications. For example, if rubber elasticity is utilized, the thermoplastic elastomers may be employed for various kinds of vulcanized rubber. If the thermoplastic elastomer according to the present invention is incorporated in hotmelt adhesives, heat resistance and recyclability properties may be enhanced. If the thermoplastic elastomer according to the present invention is added to resin or rubber, which generally exhibits cold-flow at room temperature, not only flow at the time of extrusion, but also cold-flow are prevented.

The fifth embodiment of the present invention is a rubber composition including an elastomer having an organic salt structure formed by an ionic bond in a side-chin, and solid rubber.

The rubber composition according to the present invention may be cross-linked, as the need arises, to form a cured rubber composition such that the rubber composition may be utilized as a rubber composition for tires.

Elastomers having the organic salt structure in the side-chain according to the present invention are described above.

In the present invention, solid rubber to be mixed with elastomers having the organic salt structure in the side-chain are not necessarily specific. However, examples of such solid rubber include, though not by any means limited to, diene-based rubber and their hydrogenated substances such as natural rubber, epoxidized natural rubber, isoprene rubber, styrene-butadiene rubber, hydrogenated styrene-butadiene rubber, butadiene rubber inclusive of high-cis butadiene rubber and low-cis butadiene rubber, acrylonitrile-butadiene rubber, hydrogenated acrylonitrile-butadiene rubber, and the like; olefin-based rubber such as ethylene-propylene rubber, ethylene-propylene-diene rubber, maleic acid-modified ethylene-propylene rubber, butyl rubber, a copolymer of isobutylene and an aromatic vinyl or a diene-based monomer, acrylic rubber, ionomer, and the like; halogen-containing rubber such as brominated butyl rubber, chlorinated butyl rubber, brominated substance of isobutylene-paramethylstyrene copolymer, chloroprene rubber, hydrin rubber, chlorosulfonated polyethylene, chlorinated polyethylene, maleic acid-modified chlorinated polyethylene, and the like; silicone rubber such as methylvinyl silicone rubber, methyl phenylvinvl silicone rubber, and the like; sulfur-containing rubber such as polysufide rubber; fluorinated rubber such as vinylidene fluoride-based rubber, fluorine-containing vinylether-based rubber, fluorine-containing phosphagen rubber; urethane rubber; thermoplastic elastomer such as styrene-based elastomer, for example, styrene-butadiene-styrene blockcopolymer, styrene-isoprene-styrene blockcopolymer, styrene-ethylenebutylene-styrene blockcopolymer, and the like, olefin-based elastomer, ester-based elastomer, urethane-based elastomer, polyamide-based elastomer, polyvinyl chloride-based elastomer, and the like; and thermosetting elastomer such as urethane-based elastomer, silicone-based elastomer, and the like.

A combination of the elastomer having the organic salt structure in the side-chain and solid rubber is not necessarily specific. However, the combination, in which the elastomer and the rubber have a similar polarity, is preferable from the standpoint of affinity therebetween. The combination, in which starting elastomer, and the rubber are the same, is more preferable.

As a mixing ratio of the elastomer having the organic salt structure in the side-chain, and solid rubber in the combination, (elastomeric moiety of the elastomer)/(solid rubber) is preferably 2/98–60/40. If the elastomer having the organic salt structure in the side-chain is less than the above range, processability at the time of molding and the abrasion resistance may not be improved to the desired extent. On the other hand, if the elastomer exceeds the above range, tensile strength is decreased such that loss tangent (tanδ) may be larger. Particularly, as a mixing ratio, (elastomeric portion of the above elastomer)/(solid rubber) is preferably 10/90–30/70.

The rubber composition according to the present invention may be allowed to cross-linked between the elastomer having the organic salt structure and solid rubber to form a cured substance.

Cross-linking may be performed employing a sulfur-containing compound such as sulfur, tetramethylthiuram disulfide (TMTD), dipentamethylenethiuram disulfide (DPTD), and the like; organic peroxides such as dicumylperoxides, and the like; metallic oxides such as zinc white, magnesia, and the like; or cross-linking agents such as quinonedioxime, and the like. Cross-linking may also be performed without employing a cross-linking agent.

In a cured substance of the rubber composition according to the present invention, cross-links not only between components, but also within each component are formed. Therefore, cross-links are formed between elastomers having the organic salt structure, between solid rubber, and between the elastomer and the solid rubber.

Moreover, in the cured structure of the rubber composition according to the present invention, so called multiple cross-links are formed. Therefore, cross-links are formed not only between the elastomer and the solid rubber, but also between elastomer molecules, and between solid rubber molecules.

Furthermore, cross-links are formed by a moieties having the organic salt structure such as an alkyl group in a chain form, between the elastomers each having the organic salt structure in their side chains. By these cross-linkstructures, tensile strength, abrasion resistance, and other physical properties are enhanced, while loss tangent (tan δ)is lowered.

A method of preparation of the rubber composition according to the present invention is to knead the elastomer having the organic salt structure in the side-chain, solid rubber, and other additives, as the need arises, by such as, though not by any means limited to, a twin screw extruder, a banbury mixer, or the like. Kneading under an elevated temperature is preferably performed such that the viscosity is decreased. This enables a uniform dispersion.

Moreover, in the above preparation method, even if an elastomer having a reactive moiety, which generates one of cation and anion, in a side-chain, instead of the elastomer having the organic salt structure in the side-chain, and also a compound having a reactive moiety, which will generate the other one of cation and anion, are employed, the rubber composition according to the present invention maybe obtained. In other words, an elastomer having a reactive moiety, which will generate one of cation and anion, in the side-chain, the compound having the reactive moiety, which will generate the other one of cation and anion, solid rubber, and the other additives as the need arises are kneaded by such as a twin screw extruder, a banbury, or the like such that the rubber composition according to the present invention may be obtained.

The rubber composition according to the present invention has excellent physical properties such as tensile strength, abrasion resistance, low loss tangent (tanδ), and the like. Accordingly, such rubber composition is advantageously employed in such as a tire tread, and the like.

ILLUSTRATIVE EMOBIDIMENTS

The following examples are given to illustrate the invention and should not be interpreted as limiting it in any way. Unless stated otherwise, all parts and percentages are given by weight.

(A) Preparation of Elastomer

EXAMPLE 1

5.07 g (18.8 mmol) of stearylamine was added to 36.55 g of liquid isoprene rubber modified with a carboxylic acid (L) (Kraprene LIR-410 having a carboxyl group of about 5 wt %, available from Kraray Co., Ltd.). A resultant mixture was stirred for 2 hours at 100° C. After confirming that the mixture has come to be a uniform solution, the mixture was left overnight so as to obtain an elastomer (M).

The obtained elastomer (M) was rubber-like at room temperature, but showed flowability when heated over 100° C. This phase transition was able to be reversibly repeated by cooling and heating.

COMPARATIVE EXAMPLE 1

An elastomer (P) was prepared using the method described in Example 1 except only one change, i.e., replacing the liquid isoprene rubber modified with a carboxylic acid (L) by liquid isoprene rubber without having a carboxylic acid (N) (Kuraprene LIR-30, available from Kuraray Co., Ltd.)

(B) $^1$H-NMR Spectrum Measurement $^1$H-NMR Spectrum was measured with regard to the liquid isoprene rubber modified with a carboxylic acid (L), stearylamine, and the elastomer (M).

(C) IR Spectrum Measurement

IR Spectrum was measured with regard to the liquid isoprene rubber modified with a carboxylic acid (L), and the elastomer (M).

(D) Dynamic Viscoelasticity Measurement (DMA)

Dynamic Viscoelasticity Measurement(DMA) was executed with regard to the liquid isoprene rubber modified with a carboxylic acid (L), the elastomer (M), the liquid isoprene rubber without having a carboxylic acid (N), and the elastomer (P). With reference to Dynamic Viscoelasticity Measurement (DMA), dynamic storagemodulus (G'), dynamic lossmodulus (G"), and loss tangent (tanδ) were measured. Dynamic Viscoelasticity Measurement(DMA) was executed by using a parallel cone (25 mm) with a torsional angle of 10 (rad/s), a strain of 3%, and a load of 2 g.

Figure 2:
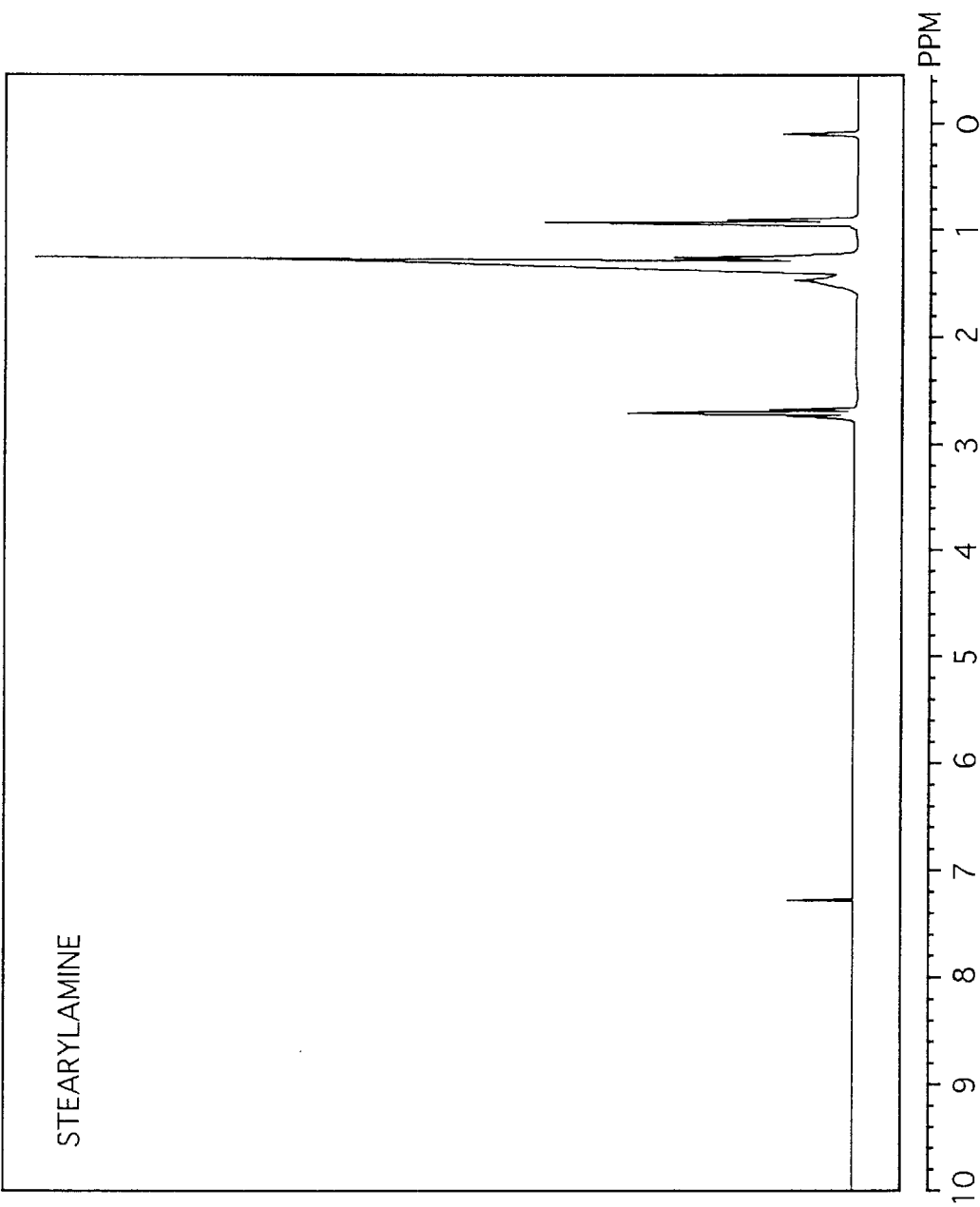
FIG. 2 is a graph showing $^1$H-NMR spectrum of stearylamine.
Figure 3:
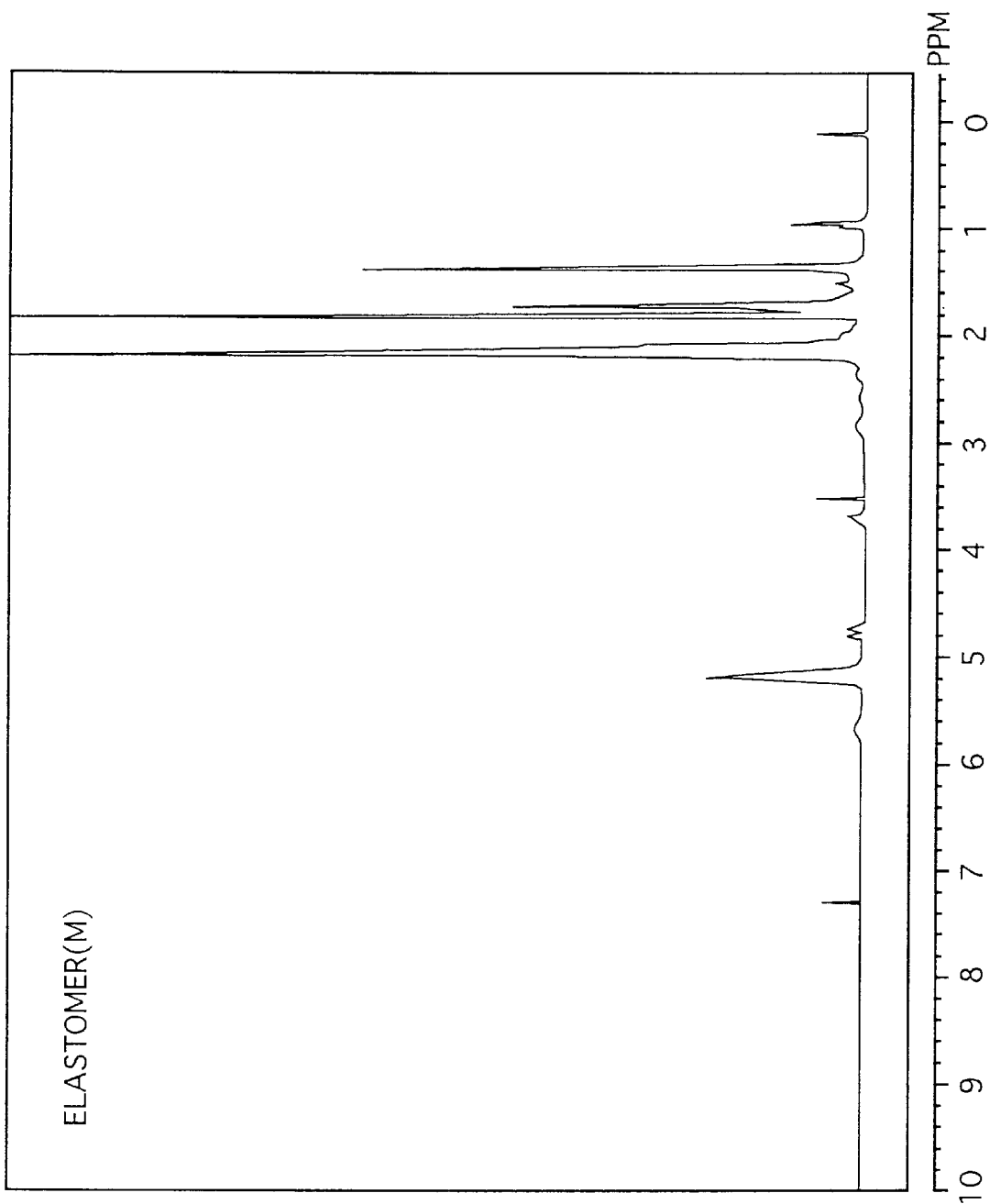
FIG. 3 is a graph showing $^1$H-NMR spectra of an elastomer (M)

Measurements on $^1$H-NMR spectrum are shown in FIGS. 1 to 3. Signals (δ=2.6–2.7 (ppm)) caused by an amino group were noticed only on stearylamine. This shows that an amino group was disappeared during the preparation process of the elastomer (M).

Measurements on IR spectrum indicate: a peak caused by an amino group in stearylamine was observed at 1606 cm$^{-1}$; and peaks caused by an ammonium salt of the elastomer (M) were observed at 3436 cm$^{-1}$, and at 1580–1680 cm$^{-1}$. This indicates that the amino group was ionized to form an ammonium salt, during the preparation process of the elastomer (M).

From the above observation, it is conceivable that the following reactions have occurred during the preparation process of the elastomer (M). Namely, a carboxyl group of the liquid isoprene rubber modified with a carboxylic acid (L) was ionized to forma carboxylate anion. At the same time, the amino group of stearylamine was ionized to form the ammonium salt. Then the resulted carboxylate anion and ammonium salt were combined to each other by an ionic bond as shown in a formula (8).

formula (8)

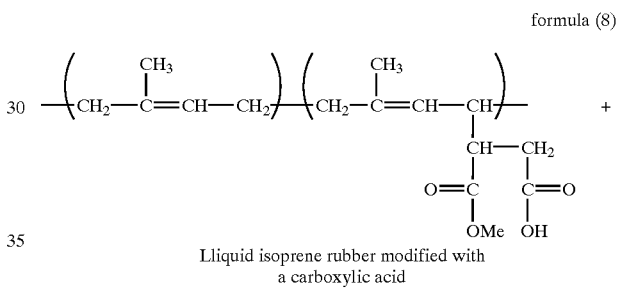

Lliquid isoprene rubber modified with a carboxylic acid

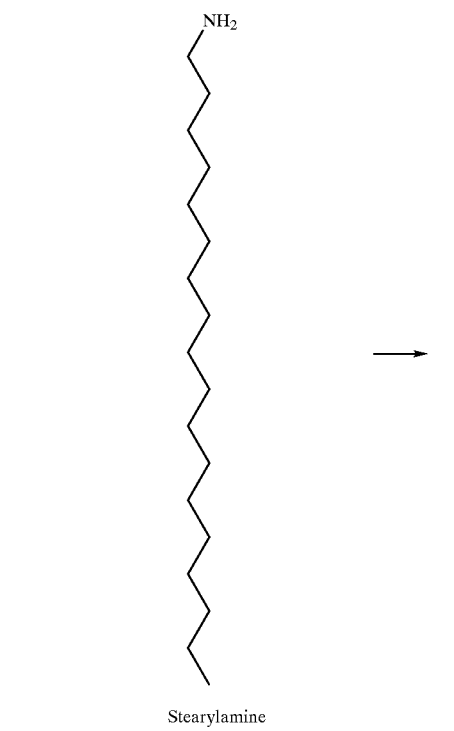

Stearylamine

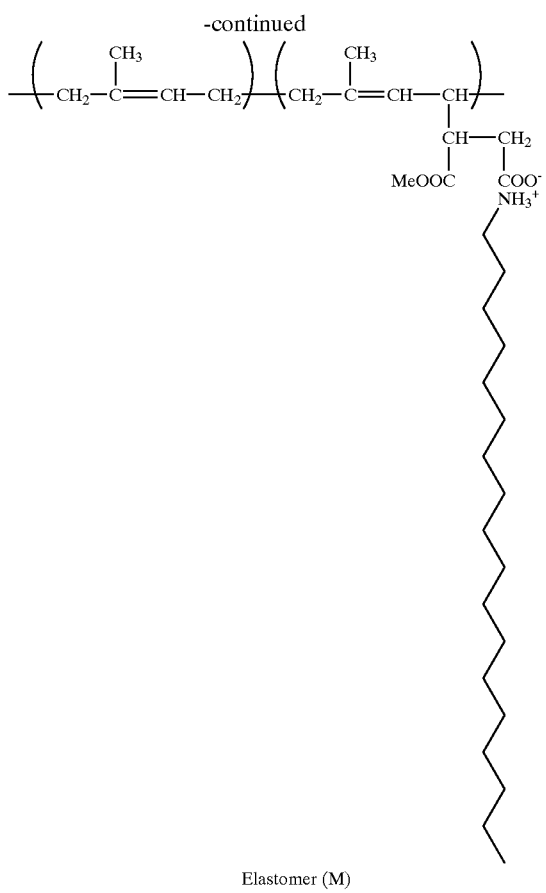

Elastomer (M)

Figure 4:
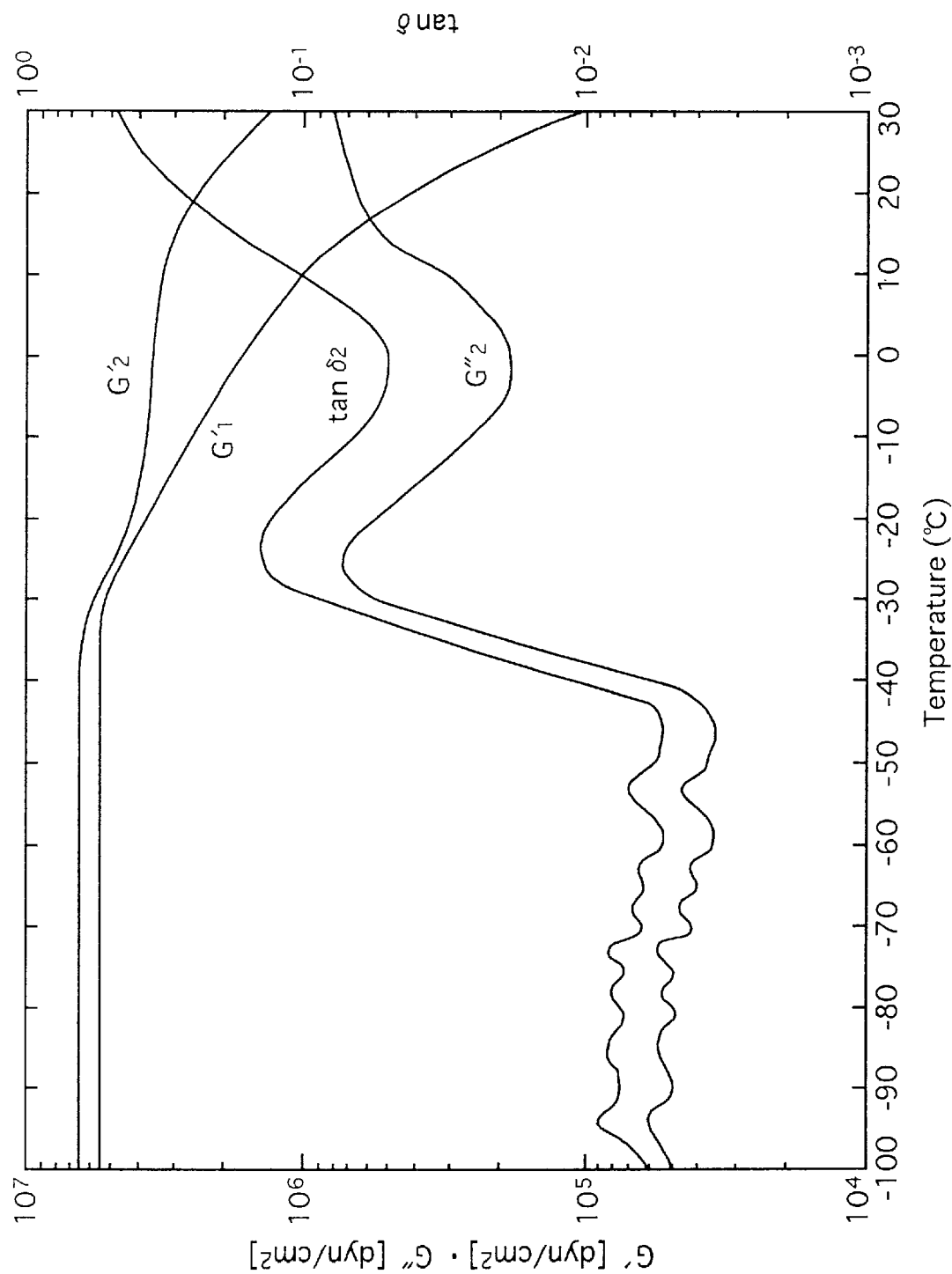
FIG. 4 is a graph showing temperature dependency of dynamic storage modulus (G') of carboxylic acid-modified liquid isoprene rubber (L), dynamic storage modulus (G'), dynamic loss modulus (G"), and loss tangent (tanδ) of elastomer (M)

Results of Dynamic Viscoelasticity Measurement (DMA) are shown in FIG. 4. In FIG. 4, dynamic storage modulus of the liquid isoprene rubber modified with a carboxylic acid (L), dynamic storage modulus, dynamic loss modulus, and loss tangent of the elastomer (M) were denoted as $G'_l$, $G'_m$, $G''_m$, $\tan\delta_m$ respectively.

As shown in the formula (8), a transition point of dynamic storage modulus (G') of the elastomer (M) was dislocated to a higher side with regard to the liquid isoprene rubber modified with a carboxylic acid (L). This confirms that a cross-link formation has occurred.

Moreover, the transition point of dynamic storage modulus (G') of the elastomer (P) was not shifted with regard to the liquid isoprene rubber without having a carboxylic acid (N).

EXAMPLE 2

0.32 g (2 mmol) of 4,4'-dipyridyl was added to 27.72 g (with a carboxyl group of 4 mmol in rubber) of liquid isoprene rubber having a carboxyl group (LIR-403, available from Kuraray Co., Ltd.). This shows that the mixing ratio is 1 equivalent weight of a carboxyl group, which will be a donor, in rubber to 1 equivalent weight of a pyridyl group, which will be an acceptor. (4,4'-dipyridyl has 2 pyridyl goups in a molecule).

As described above, 4,4'-dipyridyl was mixed to liquid isoprene rubber having a carboxyl group. A resultant mixture was stirred at 120° C. until it was confirmed to have formed a uniform solution. Then the mixture was left overnight to obtain a gel composition.

EXAMPLES 3–7

Various compounds described on Table 1 (4,4'-dipyridyl, melamine, nylon 6) were added to various liquid rubber having various amounts of carboxyl groups described on Table 1 at various equivalent weight ratios described on Table 1. Additional gel compositions were prepared using the method described in Example 2. Namely, each mixture of components were stirred at 120° C. After confirmed that the mixture formed a uniform solution, it was left overnight. Then a gel composition of each mixture was obtained.

Moreover, chemical formulas of hydrogen bonds formed between liquid isoprene rubber having a carboxyl group and compounds described above are shown in compounds (1)–(4) described above.

COMPARATIVE EXAMPLE 2

Results of various liquid isoprene rubber having various amounts of carboxyl groups described on Table 1 without adding any compound thereto are also shown on Table 1.

(E) Viscosity Measurement

In order to evaluate whether a hydrogen bond was formed or not, viscosities of compositions obtained at Examples 2–7 were measured at 40° C., and 80° C. using an E type viscometer, and a 3° cone. Results are shown on Table 1.

TABLE 1

| | | comparative examples 2 | examples 2 | examples 3 |
|---|---|---|---|---|
| compounds (cross-linking agents) | | — | dipyridyl | |
| equivalent weight of acceptor in compounds (cross-linking agents) | | 0 | 1 | 3 |
| elastomers: liquid rubber LIR-403 | viscosities [cps] at | | | |
| (carboxyl groups: 4/molecule) | 40° C. | 172600 | 589000 | 282000 |
| | 80° C. | 21200 | 42200 | 34300 |
| LIR-410 | | | | |
| (carboxyl groups: 10/molecule) | 40° C. | 257000 | | |
| | 80° C. | 26850 | | |

TABLE 1-continued

| | | examples 1 | examples 2 | examples 3 |
|---|---|---|---|---|
| CTB | | | | |
| (carboxyl groups: 2/molecule) | 40° C. 80° C. | 32750 5460 | | |
| CTBN | | | | |
| (carboxyl groups: 2/molecule) | 40° C. 80° C. | 26800 4050 | | |
| HRPIB | | | | |
| (carboxyl groups: 0.7/molecule) | 40° C. 80° C. | 59200 3630 | 57600 3860 | 75500 3040 |

| | | examples 4 | examples 5 | examples 6 | examples 7 |
|---|---|---|---|---|---|
| compounds (cross-linking agents) | | melamine | melamine | nylon 6 | nylon 6 |
| equivalent weight of acceptor in compounds (cross-linking agents) | | 1 | 3 | 1 | 3 |
| elastomers: liquid rubber | viscosities [cps] at | | | | |
| LIR-403 | | | | | |
| (carboxyl groups: 4/molecule) | 40° C. 80° C. | | | | |
| LIR-410 | | | | | |
| (carboxyl groups: 10/molecule) | 40° C. 80° C. | 334500 32800 | 375500 36600 | 344000 33300 | 468000 42900 |
| CTB | | | | | |
| (carboxyl groups: 2/molecule) | 40° C. 80° C. | 45500 7250 | 77900 15275 | | |
| CTBN | | | | | |
| (carboxyl groups: 2/molecule) | 40° C. 80° C. | 35500 6230 | 52000 12550 | | |
| HRPIB | | | | | |
| (carboxyl groups: 0.7/molecule) | 40° C. 80° C. | | | 66900 4100 | 88000 4820 |

Compounds used in Examples 2–7 are as follows:

LIR-403: liquid isoprene rubber lowly modified with carboxyl groups (available from Kuraray Co., Ltd.);

LIR-410: liquid isoprene rubber highly modified with carboxyl groups (available from Kuraray Co., Ltd.);

CTB: BR with a terminal carboxyl group (available from Ube Inds., Ltd.);

CTBN: NBR with a terminal carboxyl group (available from Ube Inds., Ltd.);

HRPIB: carboxyl-modified highly reactive polybutene (available from laboratory of Nippon Petrochemicals Co., Ltd.); and CPIB: carboxyl-modified highly reactive polybutene (available from Nippon Petrochemicals Co., Ltd.)

EXAMPLES 8–11

Compounds (acetoguanamine, benzoguanamine, 3-amino-1,2,4-triazole, citrazinic acid) described below each having equivalent weights described on Table 2 were each added to liquid rubber having a carboxyl group (LIR-403, available from Kuraray Co., Ltd.) Further gel compositions were prepared using the method described in Example 2. Namely, each mixture of components was stirred at 120° C. After confirmed that the mixture formed a uniform solution, it was left overnight. Then a gel composition of each mixture was obtained.

Viscosities of the resultant gel compositions were measured using the method described above. Results are shown on Table 2. Viscosity of Comparative Example 2, i.e., liquid rubber having a carboxyl group only (LIR-410, available from Kuraray Co., Ltd.), measured at 40° C. are shown for comparison purposes.

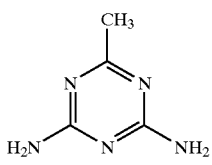

Acetoguanamine

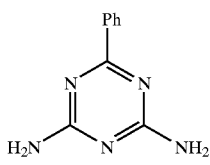

Benzoguanamine

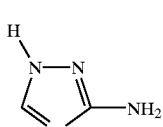

3-amino-1,2,4-triazole

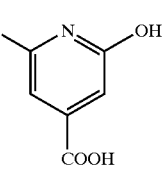

Citrazinic acid

TABLE 2

|  | comparative examples 2 | examples 8 | examples 9 | examples 10 | examples 11 |
|---|---|---|---|---|---|
| elastomers:liquid rubber compounds (cross-linking agents) viscosities [cps] at 40° C. | LIR-410 | LIR-410 acetoguanamine | LIR-410 benzoguanamine | LIR-410 3-amino-1,2,4-triazole | LIR-410 citrazinic acid |
| equivalent weight of acceptor in compounds: 0 equivalent weight | 257000 |  |  |  |  |
| equivalent weight of acceptor in compounds: 1 equivalent weight |  | 358000 | 631000 | solidified | 752000 |
| equivalent weights of acceptor in compounds: 2 equivalent weights |  | 423000 | solidified | solidified | solidified |

As shown on Table 2, all compositions obtained at Examples 8–11 show extremely higher viscosities than that of liquid isoprene rubber having a carboxyl group (LIR-410, available from Kuraray Co., Ltd.) without mixing any compound.

Moreover, an evaluation was executed as to whether a cross-link based on a hydrogen bond was formed or not, by measuring dynamic storage modulus (G'), dynamic loss modulus (G"), and loss tangent (tanδ) employing the gel composition prepared at Example 10 from liquid rubber having a carboxyl group (LIR-410, available from Kuraray Co., Ltd.), and 3-amino-4-triazole. Dynamic storage modulus (G') of liquid rubber having a carboxyl group (LIR-410, available from Kuraray Co., Lts) only without mixing 3-amino-4-triazole was also measured for comparison purposes. Measurements of dynamic storage modulus (G'), dynamic loss modulus (G"), and loss tangent (tanδ) were executed by Dynamic Viscoelasticity Measurement (DMA) using a parallel cone (25 mm) under conditions: a torsional angle of 10 (rad/s); a strain of 3%; and a load of 2 g.

Figure 5:
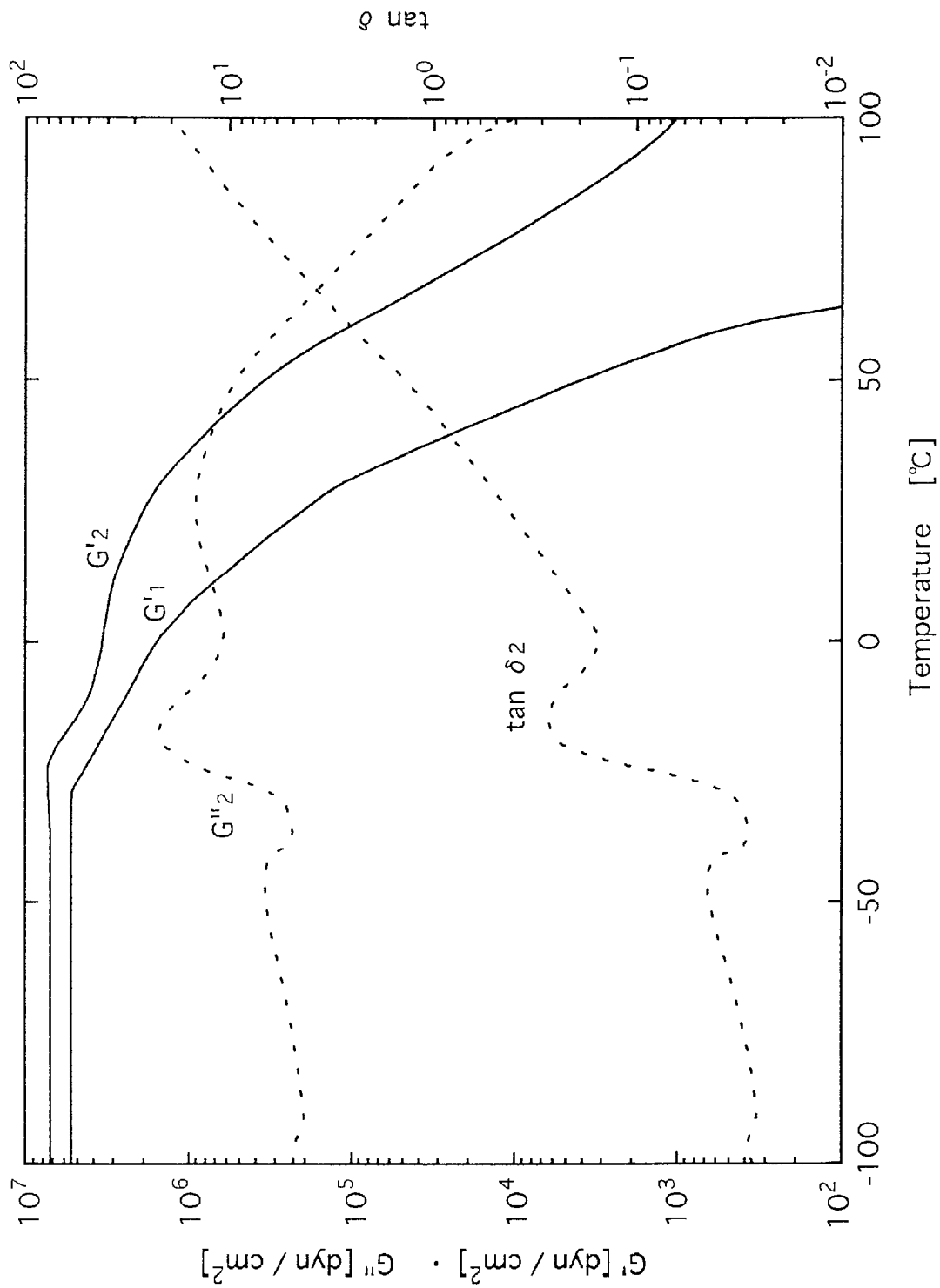
FIG. 5 is a graph showing temperature dependency of dynamic storage modulus (G'), dynamic loss modulus (G"), and loss tangent (tanδ) of a composition including liquid isoprene rubber having a carboxyl group, and 3-amino-1,2,4-triazole, and dynamic storage modulus (G') of liquid isoprene rubber having a carboxyl group.

Graphs plotted with resultant measurements are shown in FIG. 5. In the graphs, $G'_p$, $G'_m$, $G''_m$, and $\tan \delta_m$ each represent dynamic storage modulus of liquid rubber having a carboxyl group (LIR-410, from Kuraray), dynamic storage modulus, dynamic loss modulus, and loss tangent of the aforementioned gel composition respectively.

As shown in FIG. 5, the dynamic storage modulus (G') of the composition prepared by adding 3-amino-1,2,4-triazole to liquid rubber having a carboxyl group (LIR-410, from Kuraray) has been shifted to a higher temperature side than that of liquid rubber having a carboxyl group (LIR-410, from Kuraray)only. This confirmed that a cross-link had been formed in the composition.

EXAMPLES 12–15

(F) Preparation of Elastomer (Q) (Introduction of Furan Moiety)

16.38 g (0.144 mol) of furfuryl mercaptan and 1.18 g (0.00718 mol) of 2,2'-azobisisobutylonitrile were added to 15.52 g (0.287 mol as butadiene unit) of liquid butadiene rubber (Polyoil 130, available from Huels AG.). A resultant mixture was stirred for 24 hous at 60° C. under nitrogen atmosphere. Then the mixture was added to methanol to precipitate. A resultant precipitate was vacuum dried to obtain an elastomer having a furan moiety in a side chain (Q).

Figure 6:
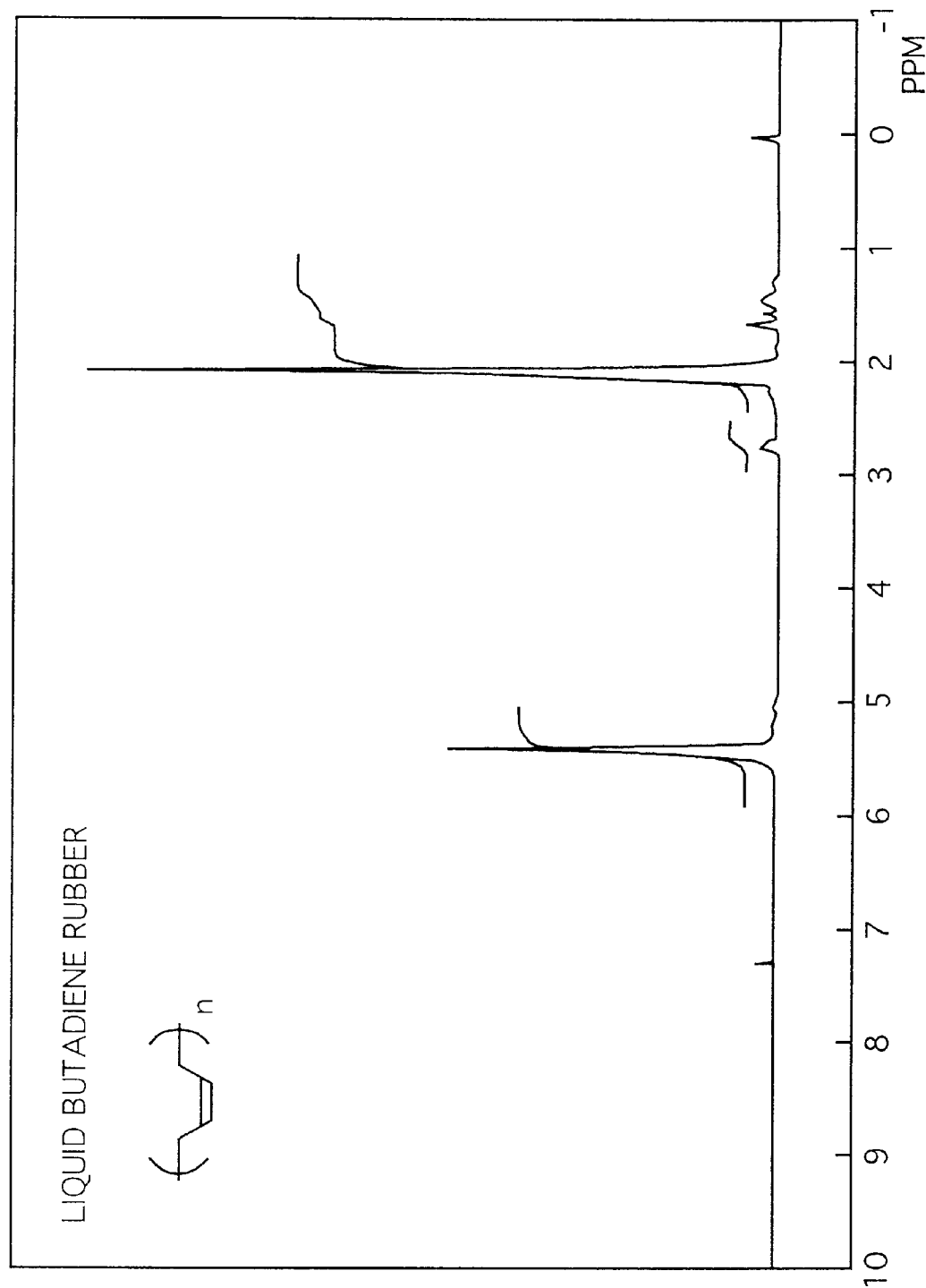
FIG. 6 is a graph showing $^1$H-NMR spectrum of liquid butadiene rubber.
Figure 7:
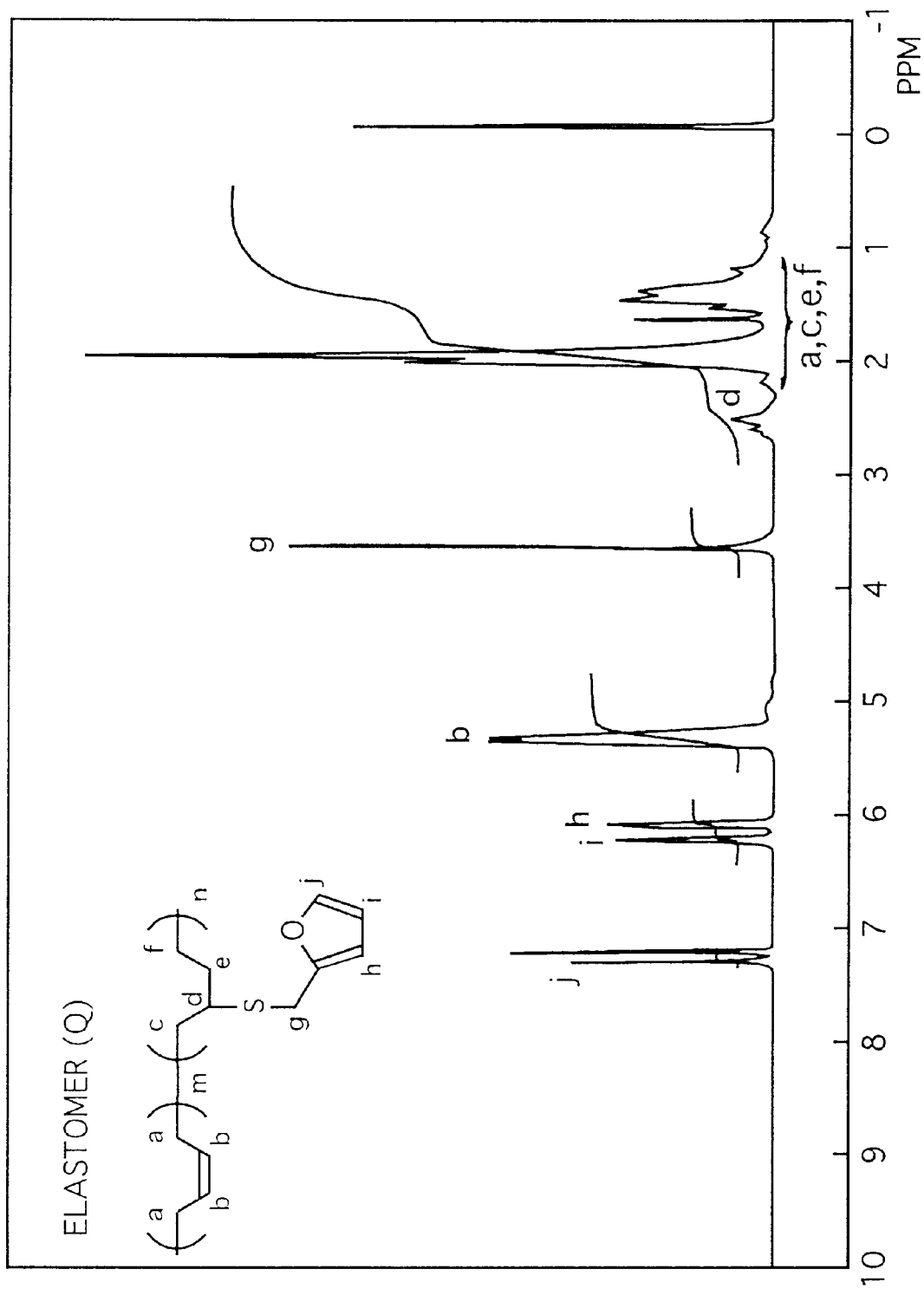
FIG. 7 is a graph showing $^1$H-NMR spectrum of elastomer (Q)

$^1$H-NMR spectrum was measured on liquid butadiene rubber and the resultant elastomer (Q) (FIGS. 6 and 7). In FIG. 7, a signal (represented by b in FIG. 7) caused by hydrogen bonded to a double bond in a main-chain of liquid butadiene rubber has come to be smaller, while signals (represented by g, h, i, and j in FIG. 7) caused by hydrogen in a furan moiety, which is not present in FIG. 6, were noticed. This confirmed that a furan moiety had been introduced into a side-chain. An introduction ratio of furan moiety into the elastomer (Q) was 23%.

(G) Preparation of Elastomer (W) (Cross-linking by Diels-Alder Reaction)

After 2.39 g (6.9 mmol as furfuryl group) of the elastomer (Q) was dissolved in 5 ml of toluene, 0.24 g (0.69 mmol) of 4,4'-bismaleimidodiphenylmethane was further added to the above toluene solution. A resultant mixture was stirred at 60° C. Viscosity of the mixture has increased as a reaction progressed such that it was unable for the mixture to be stirred any more in a few hours. The mixture gelled completely in 4 hours to obtain an elastomer (W).

Figure 8:
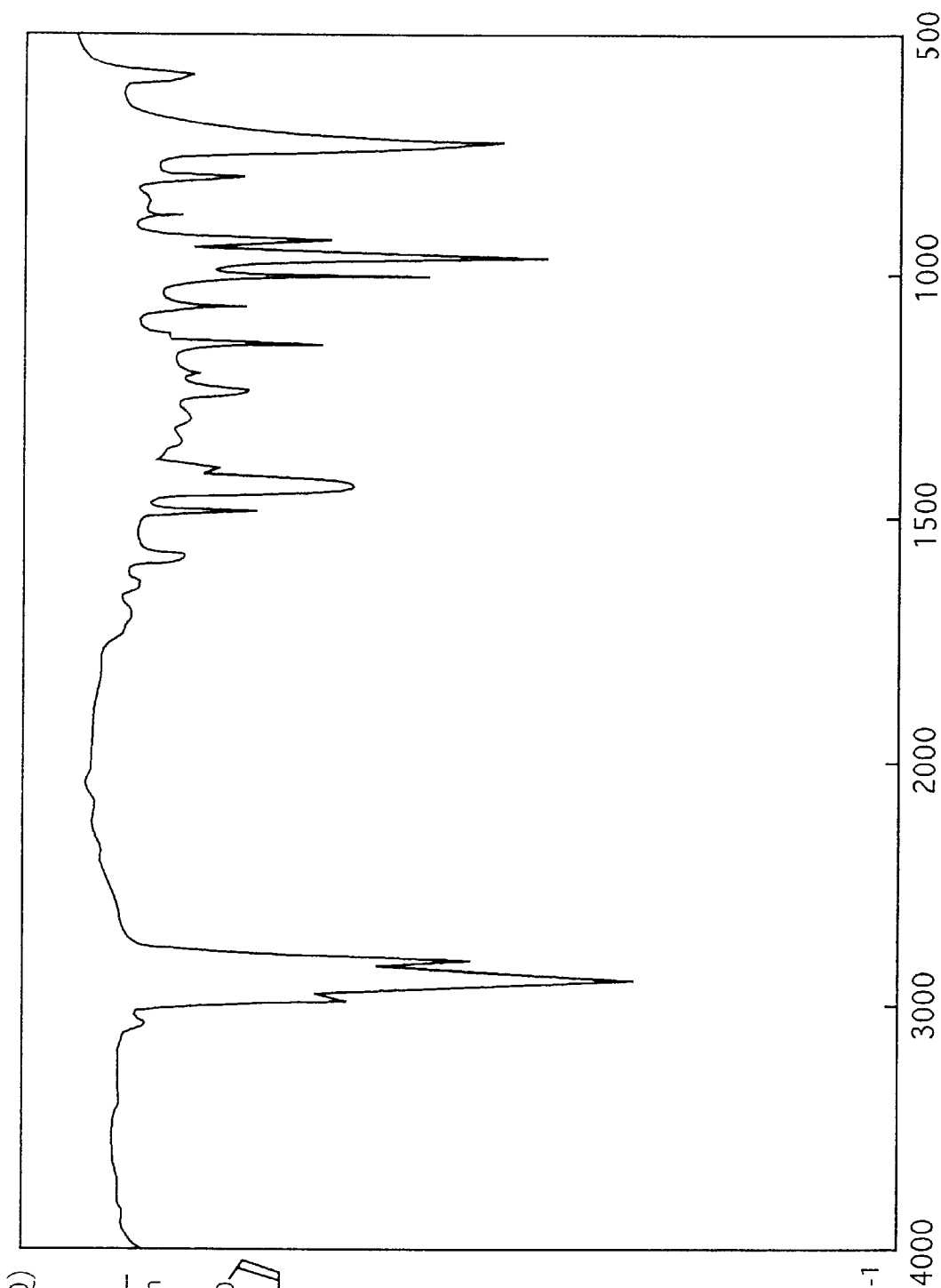
FIG. 8 is a graph showing IR spectrum of elastomer (Q)
Figure 9:
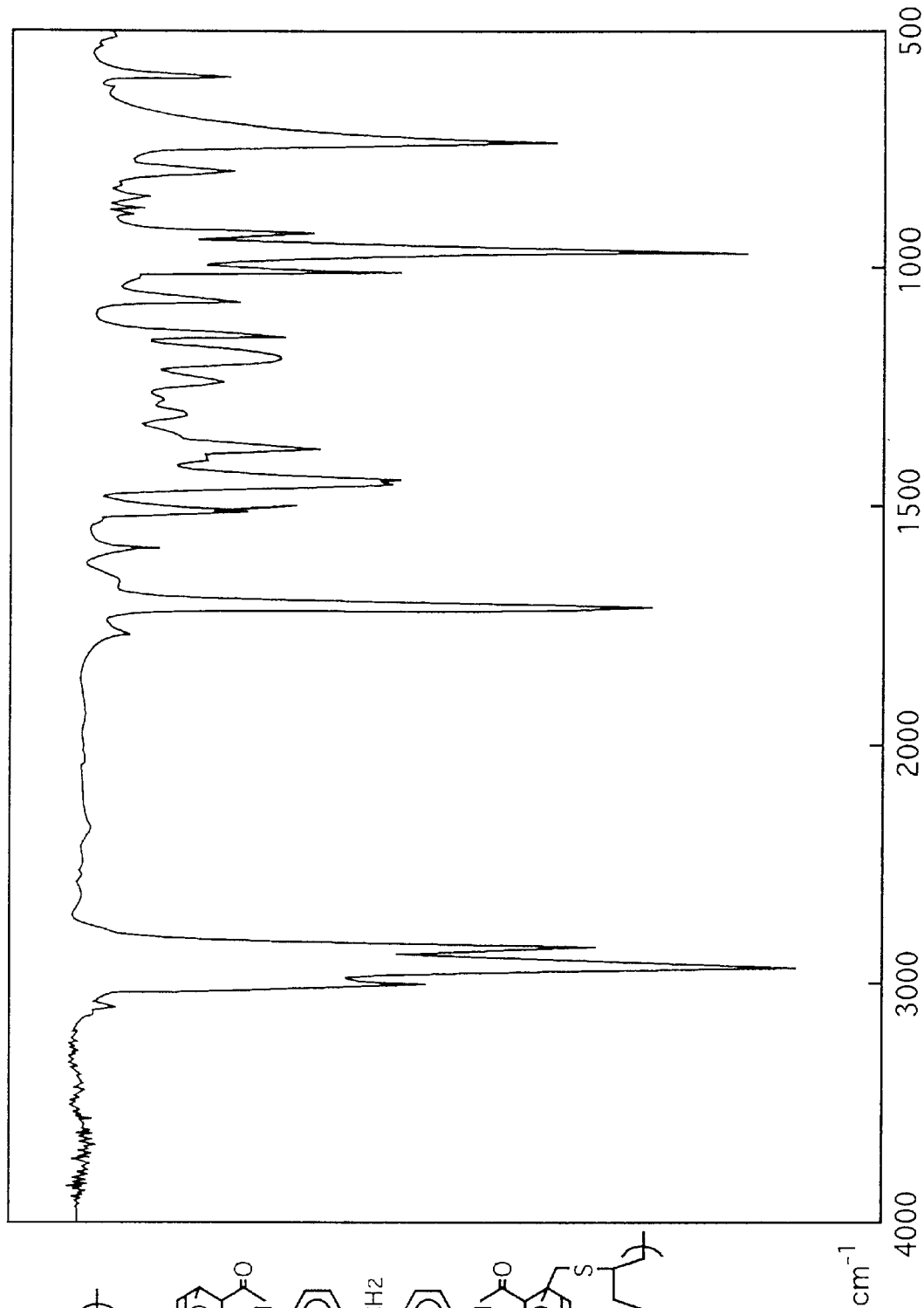
FIG. 9 is a graph showing IR spectrum of elastomer (W)

IR spectrum was measured on the elastomers (Q) and (W) (FIGS. 8 and 9). In FIG. 9, a peak was noticed at 1715 $cm^{-1}$. This confirmed that the elastomer (Q) and 4,4'-bismaleimidodiphenylmethan had been combined.

(H) Recycle of Elastomer (Q) (Cleavage of Cross-link)

The elastomer (W) in gel form was added to furan solution and stirred at 110° C. It was observed that the elastomer (W) was dissolved in one hour to form a uniform solution. Then the uniform solution was added to methanol to precipitate. A resultant precipitate was vacuum dried to obtain a dried substance.

Figure 10:
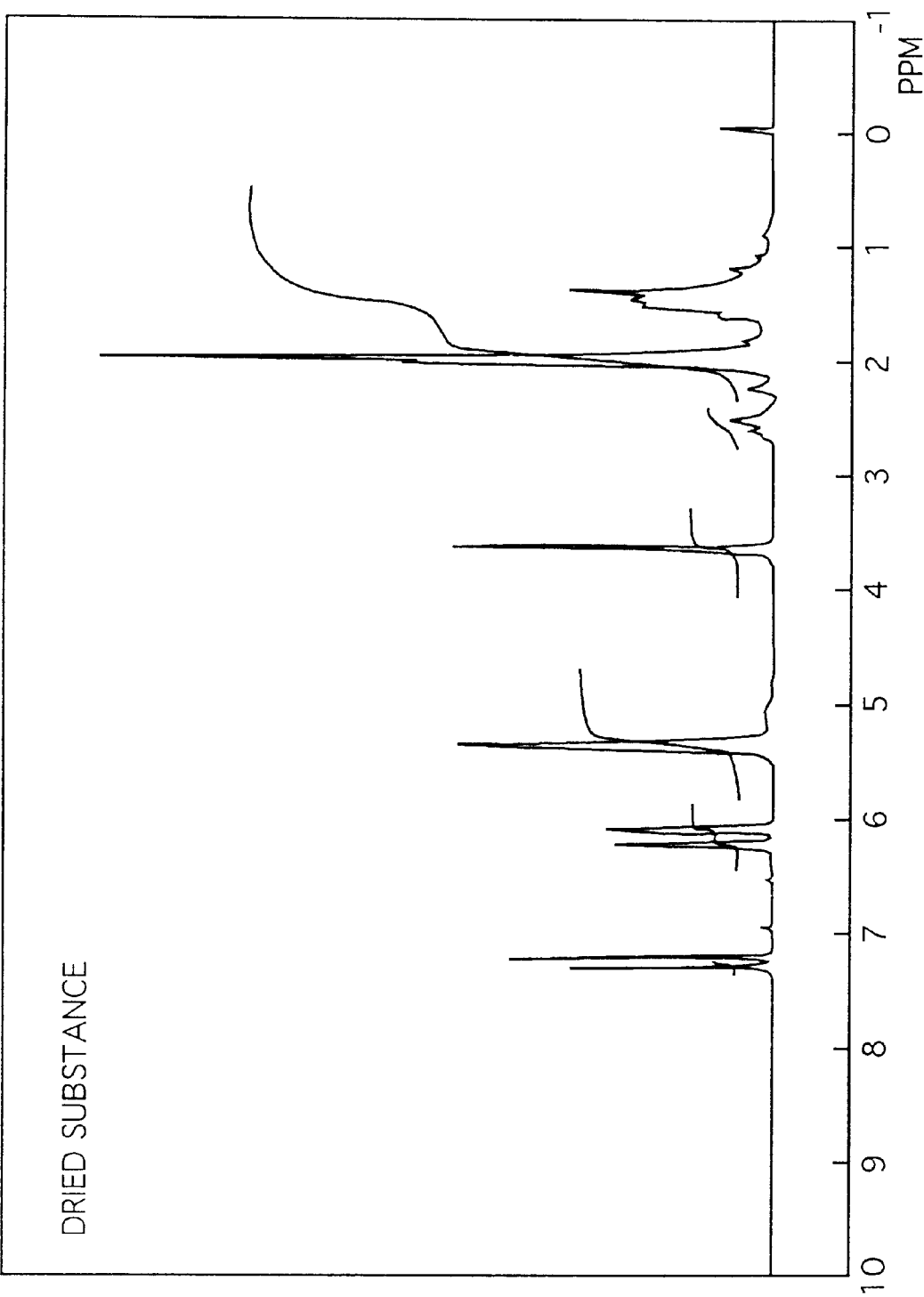
FIG. 10 is a graph showing $^1$H-NMR spectrum of dried substance.

$^1$H-NMR spectrum was measured on the resultant dried substance (FIG. 10). By comparing FIG. 10 and FIG. 8, it was confirmed that the resultant dried substance was the same as the elastomer (Q).

Moreover, it was confirmed that a furan adduct (El) of 4,4'-bismaleimidodiphnylmethan was present in a remaining solution.

Figure 11:
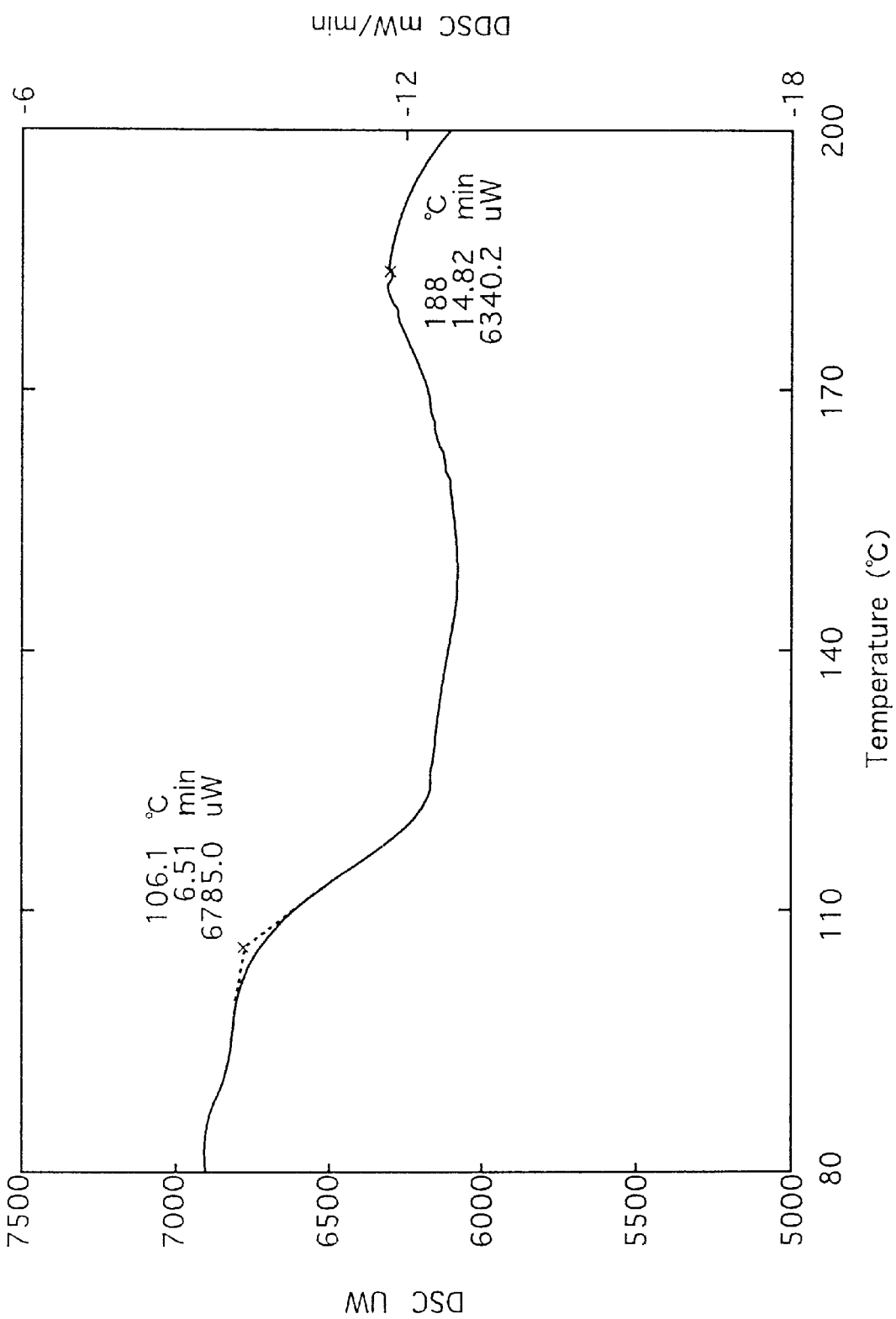
FIG. 11 is a diagram showing DSC curves of elastomer (W)
Figure 12:
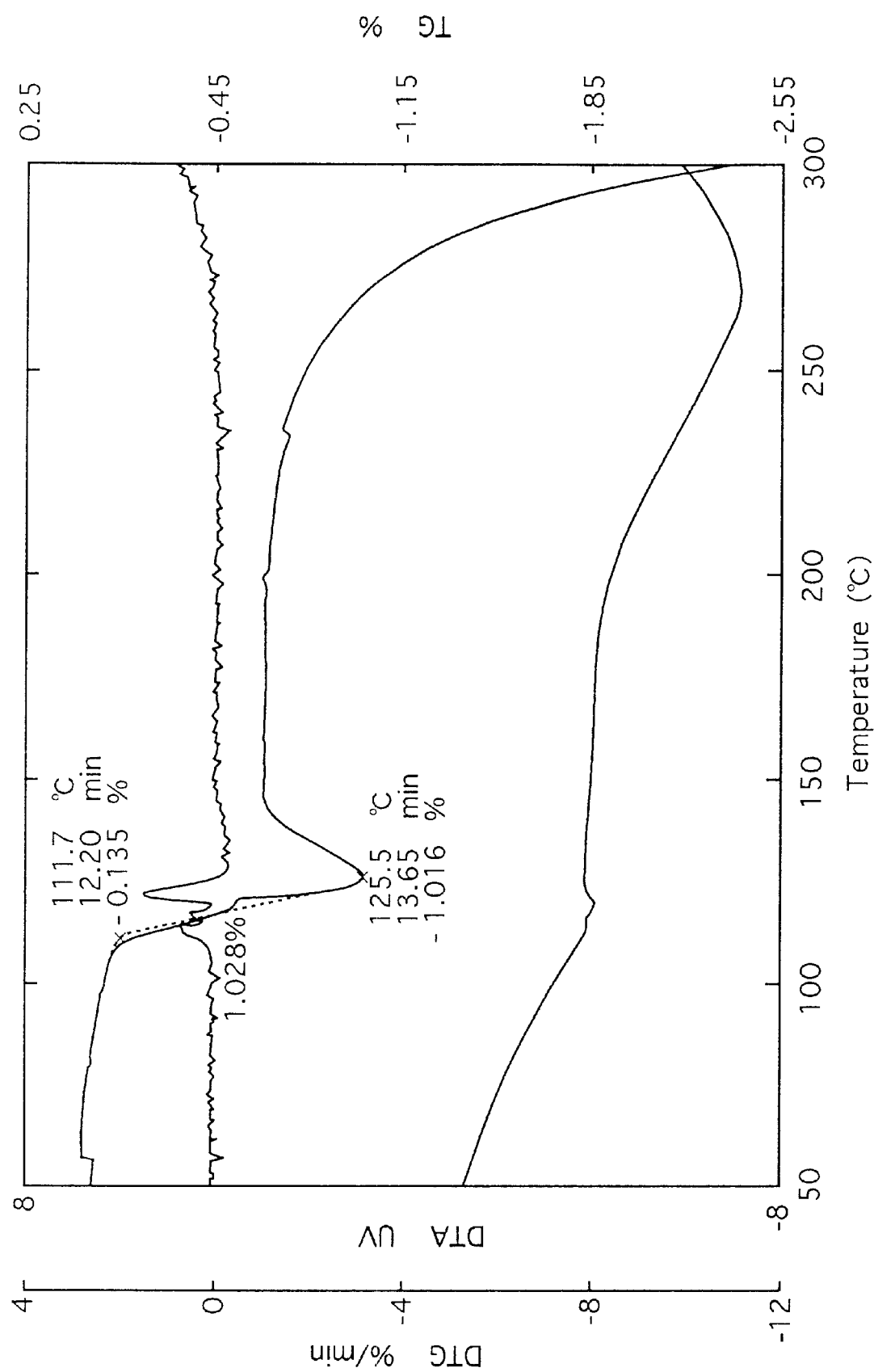
FIG. 12 is a diagram showing TG curves of elastomer (W)

When differential scanning calorimetry (DSC) was performed on the elastomer (W), it was observed that a heat absorption caused by a cross-link cleavage had started at around 106° C. (FIG. 11). When thermogravimetric analysis (TGA) was performed also on the elastomer (W), it was observed that weight loss had started at around 110° C. (FIG. 12). It was confirmed from these observations that cross-link cleavage had occurred.

(I) Recycle of Elastomer (W) (Cross-link Re-forming Following Cross-link Cleavage)

A solution of the furan adduct of 4,4'-bismaleimidodiphenylmethan obtained by the above cross-link cleavage and the elastomer (Q) was heated at 130° C. to evaporate furan solvent such that a gel substance was obtained.

When IR spectrum was measured on the gel substance, it was confirmed that the gel substance was a cross-linked substance of the elastomer (Q) and 4,4'-bismaleimidodiphenylmethan, namely, that the gel substance was the elastomer (W). From the above observation, it was conceived that 4,4'-bismaleimidodiphenylmethan, which was brought about by removing furan from the furan adduct of 4,4'-bismaleimidodiphenylmethan by means of furan solvent evaporation, had reacted with a side-chain of the elastomer (Q).

The above cross-link cleavage and re-forming reactions were reversible and were capable of repeating many times by applying different temperatures.

(J) Measurement of Temperatures of Cross-link Cleavage and Re-forming (Non-solvent System)

Based on mixing amount ratios of compounds described on Table 4, 4,4'-bismaleimidodiphenylmethan was added to the elastomer (Q), which was prepared in (F). After a resultant mixture was stirred for 1 hour at 140° C., it was left at room temperature to be cooled such that the elastomer (Z) in a complete gel form was obtained. When IR spectrum was measured on the elastomers (Q) and (Z), it was confirmed that the elastomer (Q) and 4,4'-bismaleimidodiphenylmethan were combined to one another.

When the elastomer (Z) in a gel state was stirred for 1 hour at 150° C., the elastomer (Z) was dissolved to form a uniform solution of the elastomer (Q). Then the uniform solution was cooled. A temperature, at which the solution started to gel, was defined as a cross-link cleavage temperature. In other words, when the solution was cooled, a cross-link of the elastomer was in a cleaved state (a state of cross-link being not formed) at a higher temperature than the cross-link cleavage temperature.

When the solution, which started to gel, was further cooled, it lost flowability. A temperature, at which the solution came to the elastomer (Z) in a rubber state, was defined as a cross-link re-forming temperature.

The cross-link cleavage and re-forming temperatures of each example in a non-solvent system are shown on Table 3. Moreover, when the solution prepared in Example 12 was cooled to re-form a cross-link, the solution came to be in a gel state, but did not come to be in a rubber state.

TABLE 3

| | example 12 | example 13 | example 14 | example 15 |
|---|---|---|---|---|
| elastomer (Q) | 12.1 g (0.164 mol) | 12.1 g (0.164 mol) | 12.1 g (0.164 mol) | 18.08 g (0.244 mol) |
| 4,4'-bismaleimido-diphenyl-methan (H) | 0.586 g (1.64 mmol) | 0.879 g (2.46 mmol) | 1.172 g (3.27 mmol) | 2.197 g (6.14 mmol) |
| ratio of (H) per butadiene unit of (Q) | 1.0 mol % | 1.5 mol % | 2.0 mol % | 2.5 mol % |
| cross-link cleavage temperature | 60° C. | 100° C. | 120° C. | 138° C. |
| cross-link re-forming temperature | 50° C. (gel) | 90° C. | 95° C. | 118° C. |

EXAMPLE 16

6.97 g (0.0829 mol) of 3-amino-1,2,4-triazole was added to 161.08 g (0.0829 mol on a scale of maleic anhydride moiety) of liquid isoprene rubber modified with maleic anhydride in a modification ratio of 4 wt % (LIR-410M, available from Kuraray Co., Ltd.) A resultant mixture was stirred for 3 hours at 120° C.

After confirming that the mixture came to be a uniform solution, the mixture was left overnight to obtain a reaction product in a gel state. This reaction was confirmed by $^1$H-NMR spectrum measurement (formula 9).

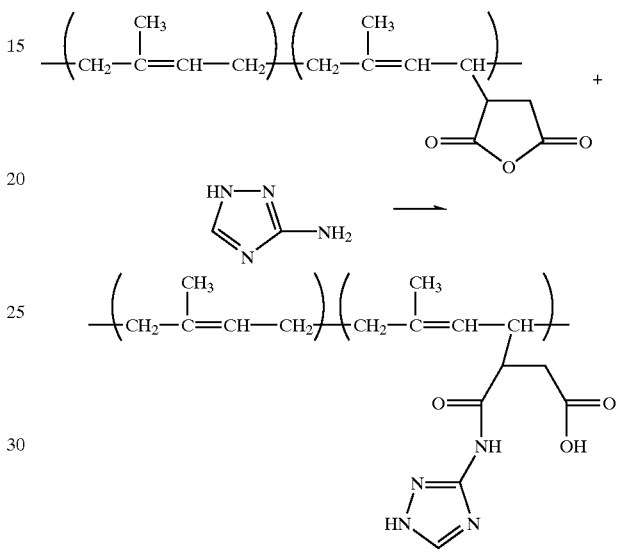

Figure 13:
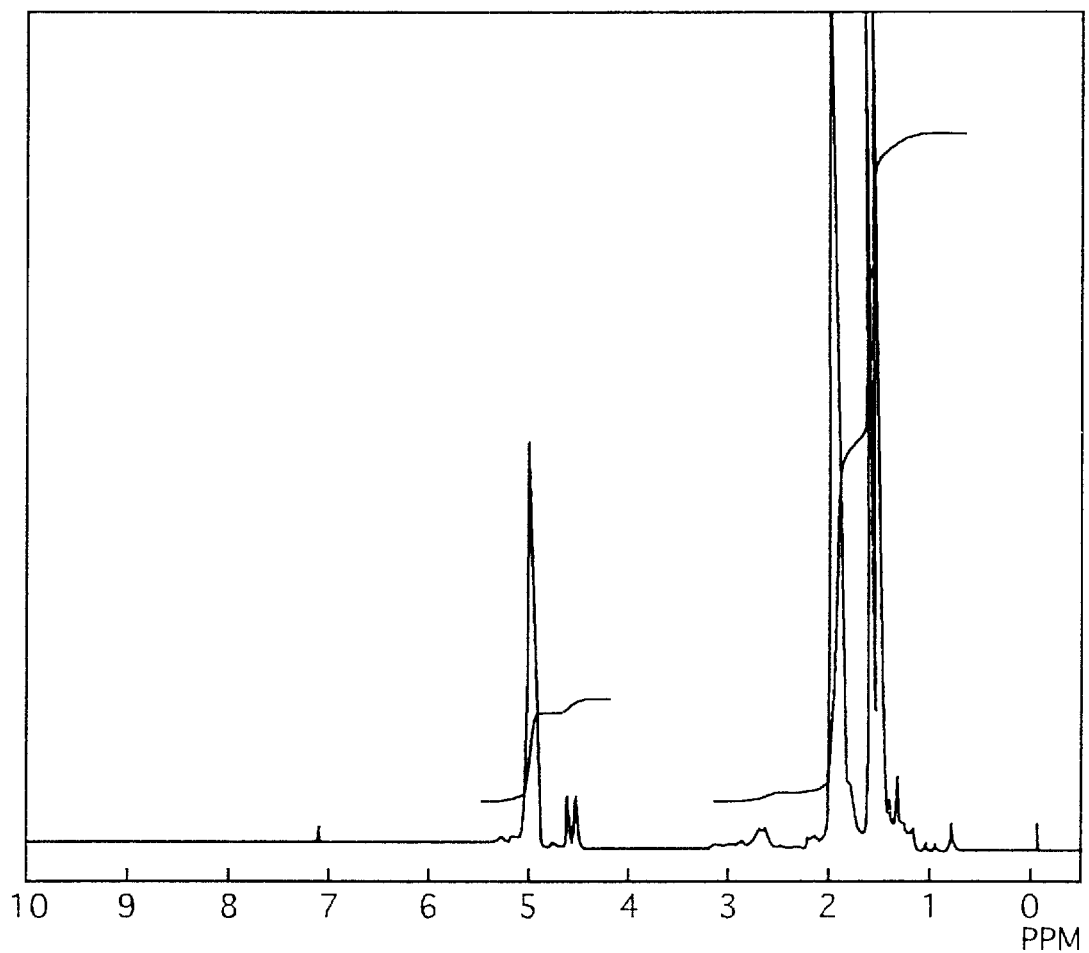
FIG. 13 is a graph showing $^1$H-NMR spectrum of maleic anhydride-modified liquid isoprene rubber.
Figure 14:
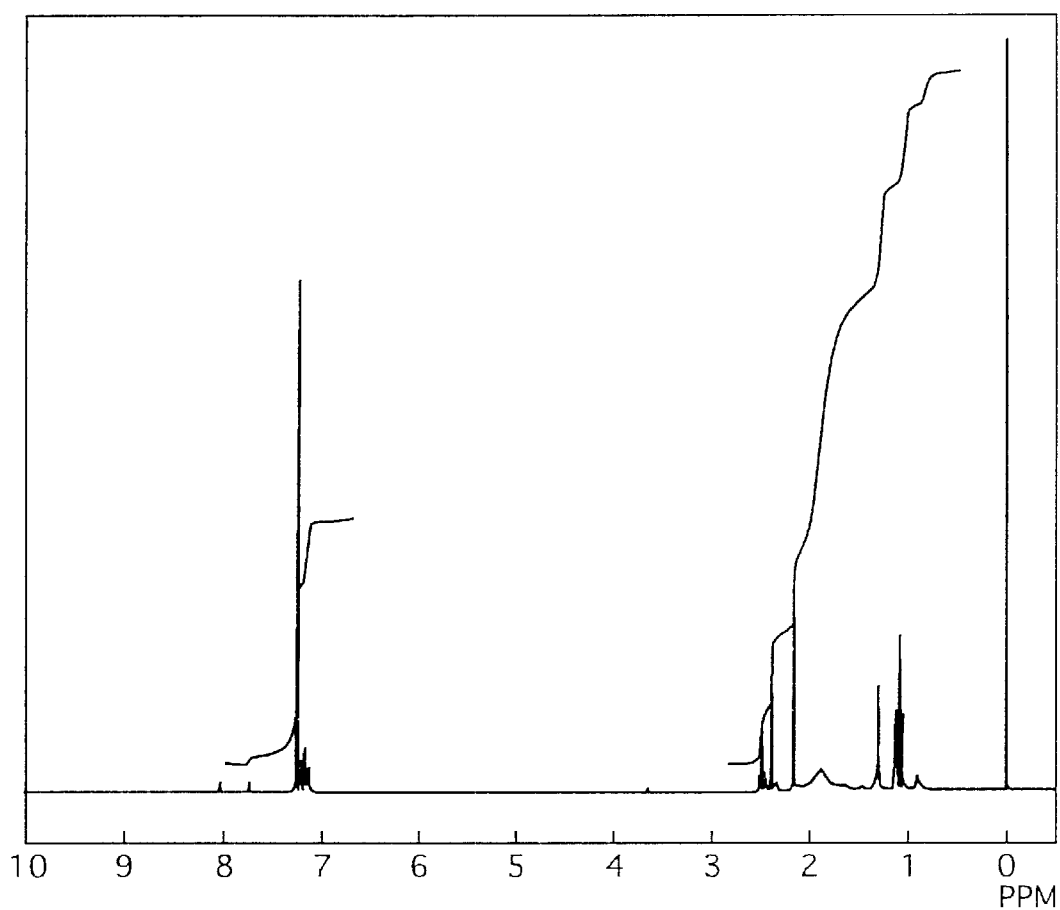
FIG. 14 is a graph showing $^1$H-NMR spectrum of 3-amino-1,2,4-triazole.
Figure 15:
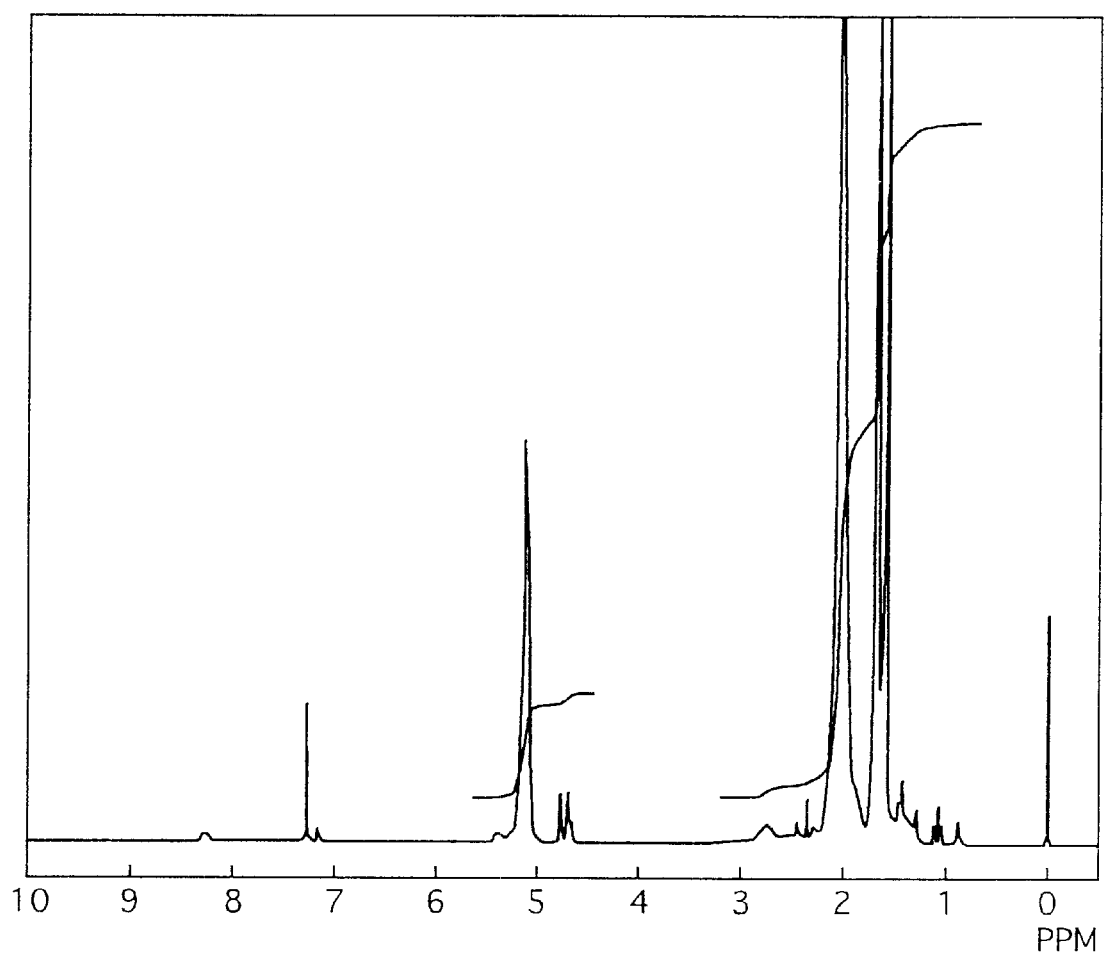
FIG. 15 is a graph showing an example of $^1$H-NMR spectrum of thermoplastic elastomer.

$^1$H-NMR spectra of liquid isoprene rubber modified with maleic anhydride, 3-amino-1,2,4-triazole, and the reaction product are shown in FIGS. 13, 14, and 15 respectively.

$^1$H-NMR measurement was performed under conditions of 270 MHz, and room temperature. The reaction product in a gel state was put on a measurement after dissolved in CDCl$_3$.

As apparent from FIG. 14 of $^1$H-NMR measurements of 3-amino-1,2,4-triazole, and FIG. 15 of $^1$H-NMR measurements of the reaction product, 2H ($\delta$=1.9 ppm) of an amino group bonded to the 3-position of 3-amino-1,2,4-triazole, which appeared in FIG. 14, have disappeared in FIG. 15, as a result of bonding with maleic anhydride. On the other hand, peaks of amido, and carboxyl groups have appeared at $\delta$=2.9 ppm, and $\delta$=8.3 ppm respectively in FIG. 15. Therefore, it was confirmed that maleic anhydride and 3-amino-1,2,4-tirazole had been bonded to one another.

Ability to form a hydrogen bond was evaluated by measuring a temperature (flow commencement temperature), at which the thermoplastic elastomer, which was obtained at Example 16, started to flow. Results are shown on Table 4.

(K) Flow Commencement Temperature Measurement

A flow commencement temperature was measured using a Koka-type flow tester. A sample of the elastomer was packed in a capillary (D=1mm, L=10 mm) and then heated at the rate of 1° C./min. under a pressure of 10 mPa. A temperature, at which the sample started to flow out of the capillary, was measured.

TABLE 4
| | | Flow commencement temperature |
|---|---|---|
| Example 16 | 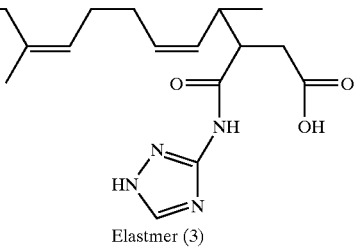 Elastmer (3) | 110° C. |
| Example 17 | 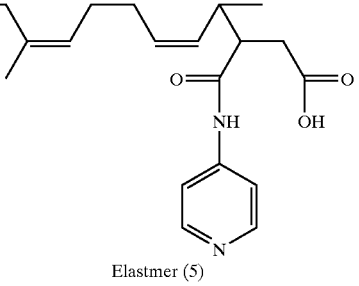 Elastmer (5) | 68° C. |
| Example 18 | 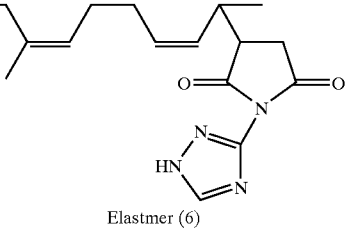 Elastmer (6) | 134° C. |
| Example 19 | 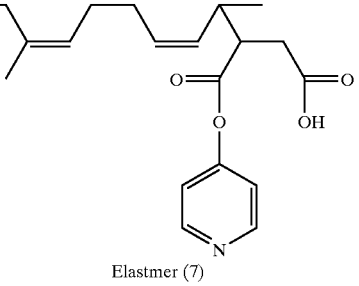 Elastmer (7) | 73° C. |
| Example 20 | 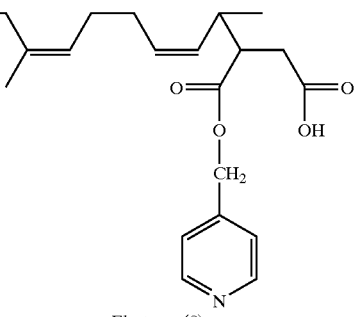 Elastmer (8) | 42° C. |
| Comparative Example 3 | LIR-410M | Lower than room temperature |
| Comparative Example 4 | Reaction product between LIR-410M and $C_3H_7$~$C_{18}H_{37}$ | Lower than room temperature |

EXAMPLE 17

A reaction product in a gel state was prepared using the method described in Example 16, but using 4-amino-pyridine (0.0829mol) instead of 3-amino-1,2,4-triazole, while allowing the following reaction (formula 10).

$^1$H-NMR spectrum was measured using 270 MHz at room temperature. The reaction product in a gel state was measured after dissolved in CDCl$_3$.

formula 10

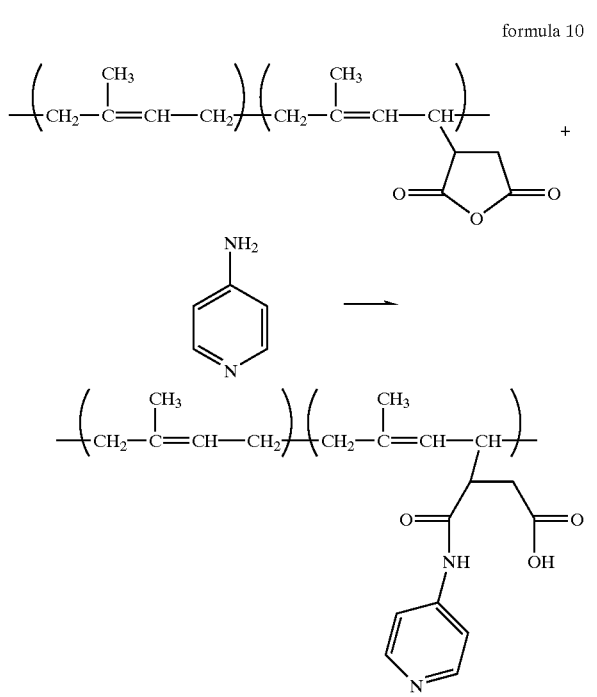

Figure 16:
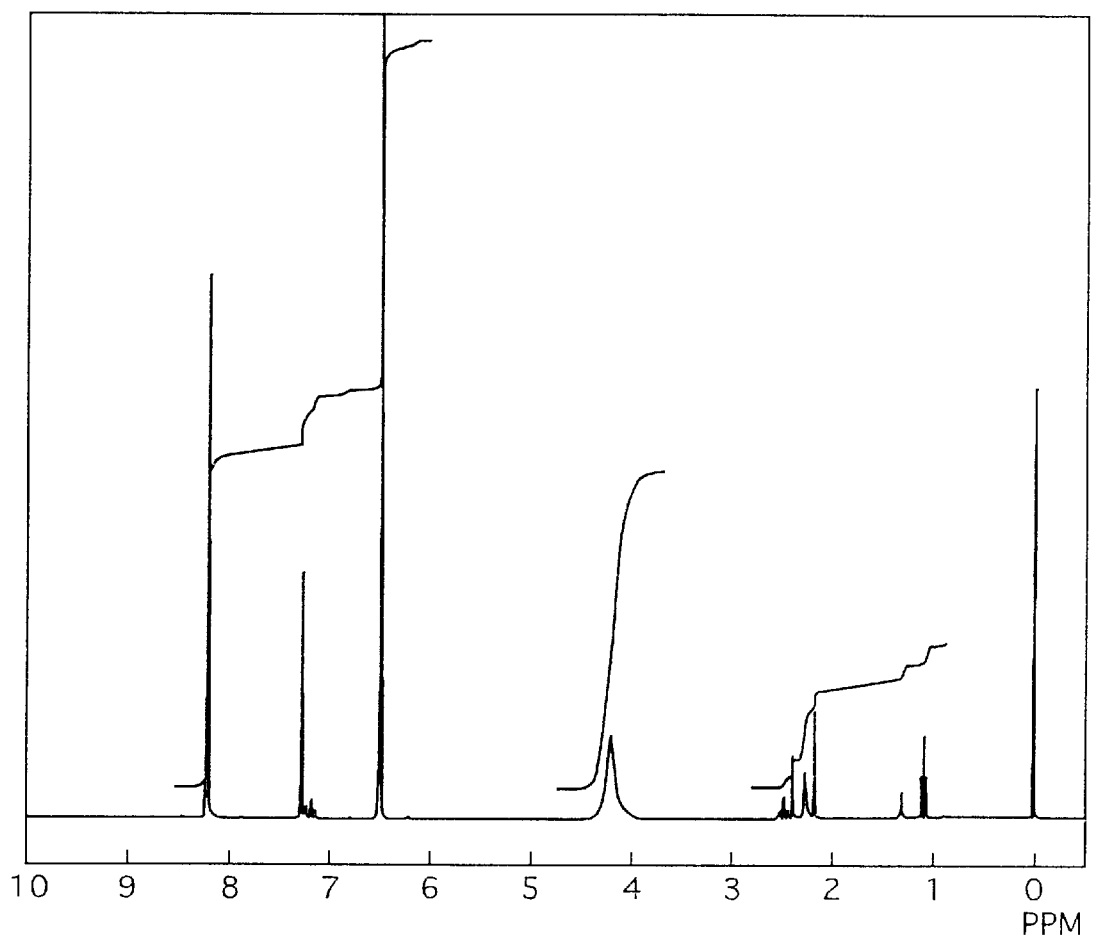
FIG. 16 is a graph showing $^1$H-NMR spectrum of 4-amino-pyridine.
Figure 17:
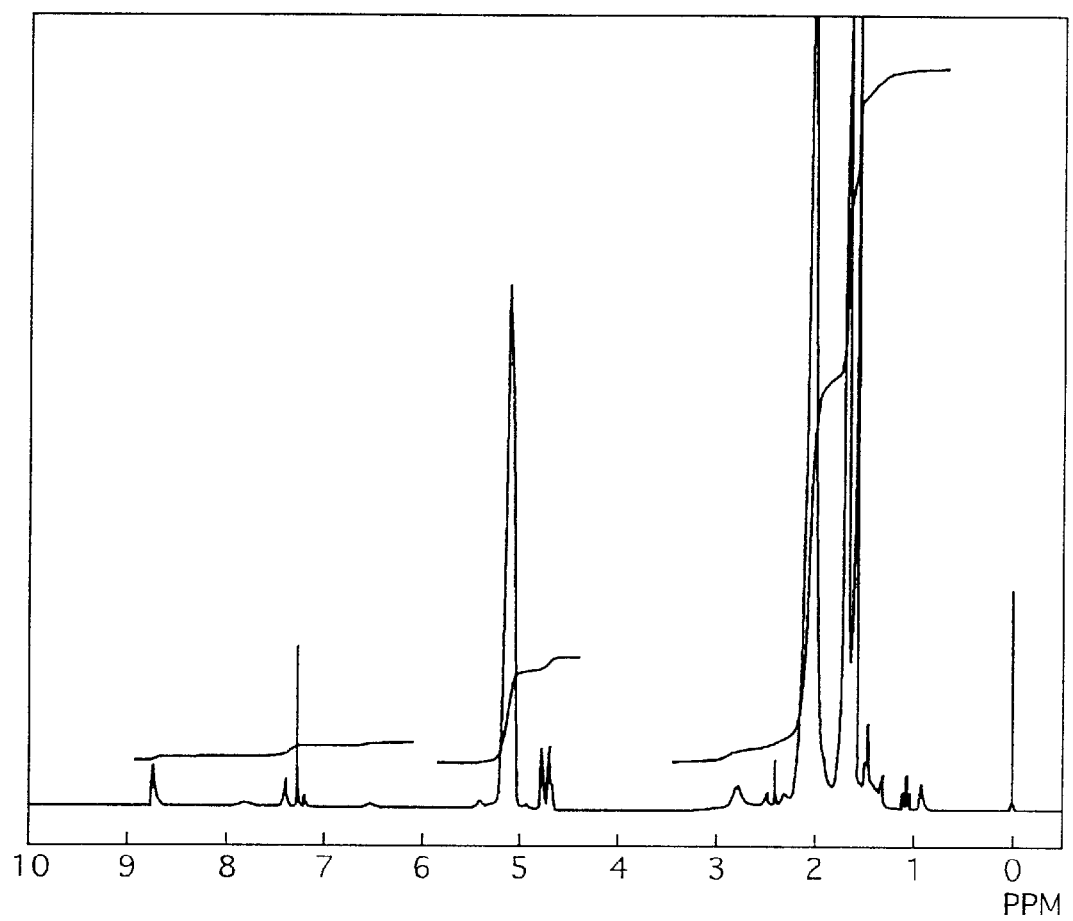
FIG. 17 is a graph showing another example of $^1$H-NMR spectrum of thermoplastic elastomer.

$^1$H-NMR spectra of 4-amino-pyridine and the reaction product are shown in FIGS. 16 and 17 respectively.

As being similar to Example 16, 2H (δ=1.1 ppm) of an amino group bonded to the 2-position of pyridine in $^1$H-NMR spectrum of 4-amino-pyridine have disappeared, as a result of bonding with maleic anhydride. On the other hand, peaks of amido, and carboxyl groups have appeared at around δ=2.9 ppm, and δ=8.7 ppm respectively. Therefore, it was confirmed that maleic anhydride and 4-amino-pyridine had been bonded to one another.

Ability to form a hydrogen bond was evaluated by measuring a temperature, at which the thermoplastic elastomer started to flow. Results are also shown on Table 4.

EXAMPLE 18

A reaction product in a gel state was prepared using the method described in Example 16, but applying a reaction temperature of 150° C. instead of 120° C. A flow commencement temperature of the reaction product in a gel state is shown on Table 4.

EXAMPLE 19

A reaction product in a gel state was prepared using the method described in Example 16, but using 4-hydroxy-pyridine (0.0829 mol) instead of 3-amino-1,2,4-triazole. A flow commencement temperature of the reaction product in a gel state is shown on Table 4.

EXAMPLE 20

A reaction product in a gel state was prepared using the method described in Example 16, but using 4-methylol-pyridine (0.0829 mol) instead of 3-amino-1,2,4-triazole. A flow commencement temperature of the reaction product in a gel state is shown on Table 4.

COMPARATIVE EXAMPLE 3

Flow commencement temperature of liquid isoprene rubber modified with maleic anhydride (LIR-410M, available from Kuraray Co., Ltd), which was employed in Example 16, is shown on Table 4.

COMPARATIVE EXAMPLE 4

A reaction product in a gel state was not prepared by the method described in Example 16, when 3-amino-1,2,4-triazole, which had been employed in Example 16, was replaced by α-olefin with a carbon number of 3–18. The elastomer in Example 16 remained in a liquid state.

(L) Preparation of Rubber Composition

Various rubber compositions described on Table 5 were prepared using compounds described below at various mixing amount ratios described on Table 5. The compositions have each undergone cross-linking for 20 minutes at 160° C.

(1). Elastomers

Isoprene:
Nipol IR-2200, available from Nippon Zeon Co., Ltd.
Liquid Polyisoprene Modified with a Carboxylic Acid (L):
Kuraprene LIR-410 (weight average molecular weight: 25000; carboxylic acid content: 10 groups/molecular; and Tg: −59° C.), available from Kuraray Co., Ltd.
Elastomer M:
Having 14 weight parts of stearylamine to 100 weight parts of liquid isoprene rubber modified with a carboxylic acid (L).
Liquid Polyisoprene:
Kuraprene LIR-30 (weight average molecular weight: 29000; and Tg: −63° C.), available from Kuraray Co., Ltd.

(2). Additives

Carbon Black: Showblack N339HAF, available from showa Cabbot Co., Ltd.
Zinc White:
Zinc white, available from Toho Zinc Co., Ltd.
Stearic Acid:
Beaded stearic acid, available from Nippon Oils & Fats Co., Ltd.
Antioxidant:
Santoflex 13, available from Monsanto Japan, Ltd.
Stearylamine:
generic
Sulfur:
generic
Accelerator:
Nocceller® -CZ-G, available from Ouchi-Shinko Chemical Industrial Co., Ltd.

Following tests were performed on each of rubber compositions before and after cross-linked. Results are shown on Table 5.

(M) Mooney Viscosity Test

Mooney viscosities of rubber compositions before cross-linked were measured according to JIS K6300 using a Mooney viscometer. Measurement was performed after the compositions were preheated for 1 minute and stirred with an L-shaped rotor for 4 minutes at 100° C.

(N) Tensile Test

Tensile strength, elongation, and tension ($M_{100}$ at 100% extension and $M_{300}$ at 300% extension) of cross-linked rubber compositions were measured according to JIS K6251.

(O) Loss Tangent (tanδ) Measurement

Cross-linked rubber compositions were formed into sheets. The sheets were cut into strips with 5 mm wide, 40 mm long and 2 mm thick. Loss Tangent (tanδ) was measured using these strips according to a mechanical impedance method (JIS H7002) Measurements were performed at 0° C., 20° C., and 40° C. at 20 Hz±2%

(P) Abrasion Test

Lambourn abrasion test was performed on rubber compositions after cross-linked according to JIS K6264. Measurements were done with a load of 1.5 kg, and a slip ratio of 50%. Results are shown as relative indices of values to an anti-abrasion index of Comparative Example 5 value being 100.

(Q) Immersion Test

Toluene-soluble substances were extracted from cross-linked rubber compositions by toluene by means of a Soxhlet extractor. Ratios (weight %) of toluene extracts against the weights of the rubber compositions were found.

TABLE 5

|  |  |  | comparative example 5 | comparative example 6 | comparative example 7 | comparative example 8 |
|---|---|---|---|---|---|---|
| compositions (weight parts) | elastomers | isoprene | 100 | 90 | 70 | 90 |
|  |  | liquid polyisoprene modified with a carboxylic acid elastomer M |  | 10 | 30 |  |
|  |  | liquid polyisoprene |  |  |  | 10 |
|  | compounds | carbon black | 50 | 50 | 50 | 50 |
|  |  | zinc white | 3 | 3 | 3 | 3 |
|  |  | stearic acid | 1 | 1 | 1 | 1 |
|  |  | antioxidant | 2 | 2 | 2 | 2 |
|  |  | stearylamine |  |  |  | 1.4 |
|  |  | sulfur | 2.1 | 2.1 | 2.1 | 2.1 |
|  |  | accelerator | 1 | 1 | 1 | 1 |
| physical properties | Mooney viscosity [ML (1 + 4) 100° C.] |  | 107.6 | 101.4 | 80.8 | 72.4 |
|  | tensile strength |  | 26.9 | 18.7 | 13.8 | 26.7 |
|  | elongation |  | 525 | 444 | 579 | 600 |
|  | $M_{100}$ [Mpa] |  | 2.7 | 2.8 | 2.1 | 2.1 |
|  | $M_{300}$ [Mpa] |  | 12.9 | 11.0 | 6.4 | 10.8 |
|  | tan δ 0° C. |  | 0.275 | 0.275 | 0.314 | 0.285 |
|  | 20° C. |  | 0.212 | 0.215 | 0.279 | 0.218 |
|  | 40° C. |  | 0.183 | 0.190 | 0.260 | 0.180 |
|  | 60° C. |  | 0.156 | 0.175 | 0.257 | 0.158 |
|  | anti-abrasion index |  | 100 | 83.1 | 87.4 | 91.8 |
|  | toluene extract [%] |  | 5.00 | 4.69 | 7.12 | 5.11 |

|  |  |  | example 21 | example 22 | example 23 |
|---|---|---|---|---|---|
| compositions (weight parts) | elastomers | isoprene | 90 | 85 | 70 |
|  |  | liquid polyisoprene modified with a carboxylic acid elastomer M liquid polyisoprene | 11.4[1)] | 17.1[2)] | 34.2[3)] |
|  | compounds | carbon black | 50 | 50 | 50 |
|  |  | zinc white | 3 | 3 | 3 |
|  |  | stearic acid | 1 | 1 | 1 |
|  |  | antioxidant | 2 | 2 | 2 |
|  |  | stearylamine |  |  | 1.4 |
|  |  | sulfur | 2.1 | 2.1 | 2.1 |
|  |  | accelerator | 1 | 1 | 1 |
| physical properties | Mooney viscosity [ML(1 + 4) 100° C.] |  | 90.2 | 83.4 | 75.2 |
|  | tensile strength |  | 27.6 | 25.6 | 18.6 |
|  | elongation |  | 588 | 586 | 589 |
|  | $M_{100}$ [Mpa] |  | 2.9 | 2.9 | 2.8 |
|  | $M_{300}$ [Mpa] |  | 12.1 | 11.2 | 9.0 |
|  | tan δ 0° C. |  | 0.258 | 0.230 | 0.245 |
|  | 20° C. |  | 0.194 | 0.171 | 0.183 |
|  | 40° C. |  | 0.170 | 0.150 | 0.182 |
|  | 60° C. |  | 0.157 | 0.148 | 0.207 |
|  | anti-abrasion index |  | 103.7 | 101.5 | 89.5 |
|  | toluene extract [%] |  | 4.69 | 4.79 | 5.48 |

[1)]10 weight parts as elastomer stock
[2)]15 weight parts as elastomer stock
[3)]30 weight parts as elastomer stock Rubber compositions (Examples 21–23) according to the present invention have lower Mooney viscosities compared with those of following solid rubber and its compositions:

solid rubber, which is not blended with any elastomer (Comparative Example 5); and solid rubber, which is blended with either liquid polyisoprene modified with a carboxylic acid, or liquid polyisoprene, each in the same amount as the amount of a starting elastomer (Comparative Examples 6–8).

Because of the low viscosity, it is understood that the rubber compositions according to the present invention have excellent processability.

Moreover, the rubber compositions according to the present invention are excellent in tensile strength, elongation, and modulus, while the compositions are low in loss tangent (tan$\delta$) at various temperatures.

Furthermore, each composition with a relatively lower elastomer content (Examples 21–22) has an excellent anti-abrasion property. Since an amount of substances to be extracted from each composition by toluene is small, each composition has an excellent solvent-resistant property.

Figure 18:
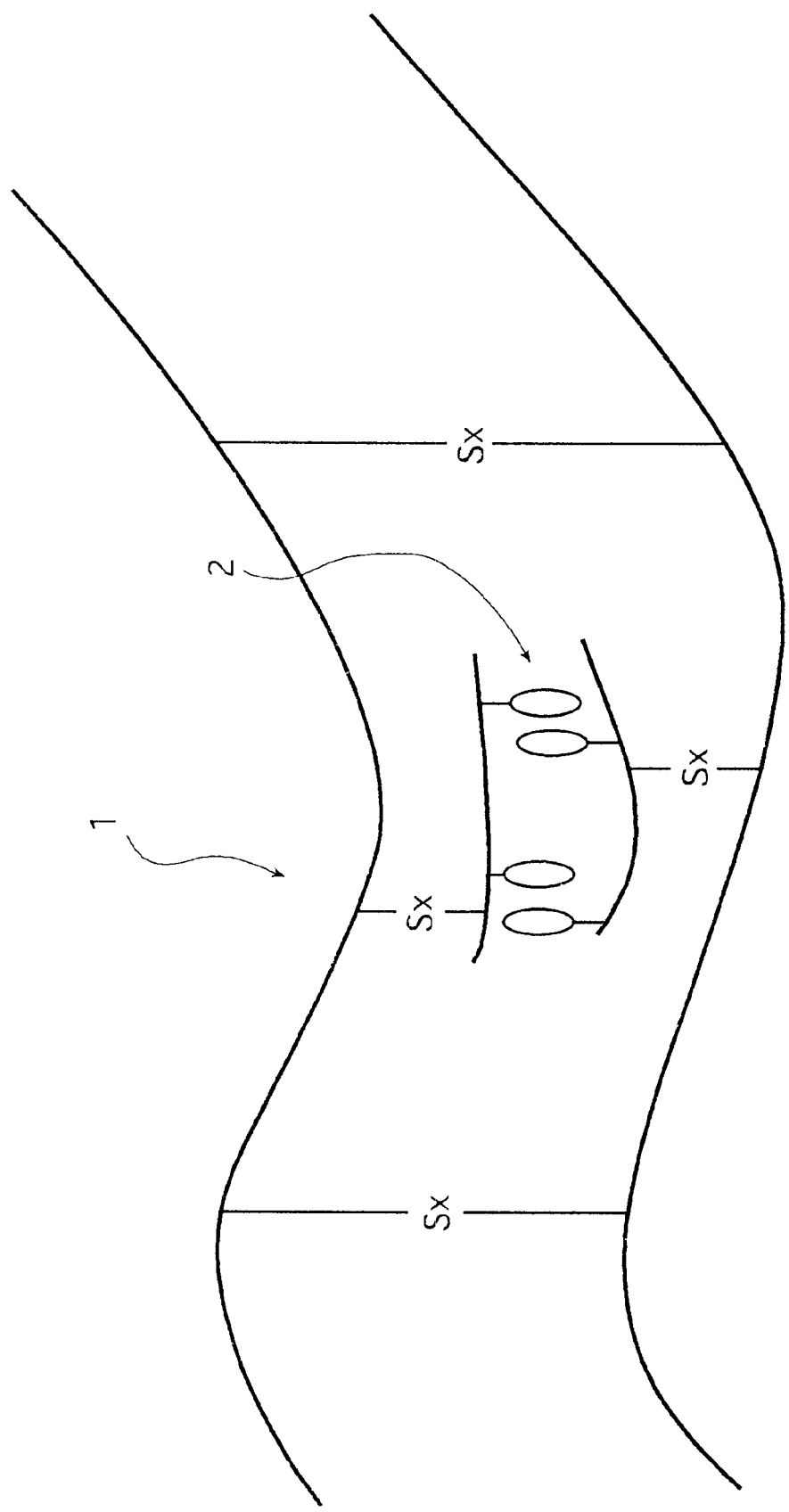
FIG. 18 is a schematic view showing a state, in which a cross-link is formed between an elastomer having an organic salt structure in its side-chain and solid rubber, and a cross-link is formed between elastomers each having an organic salt structure in their side-chains.
Figure 19:
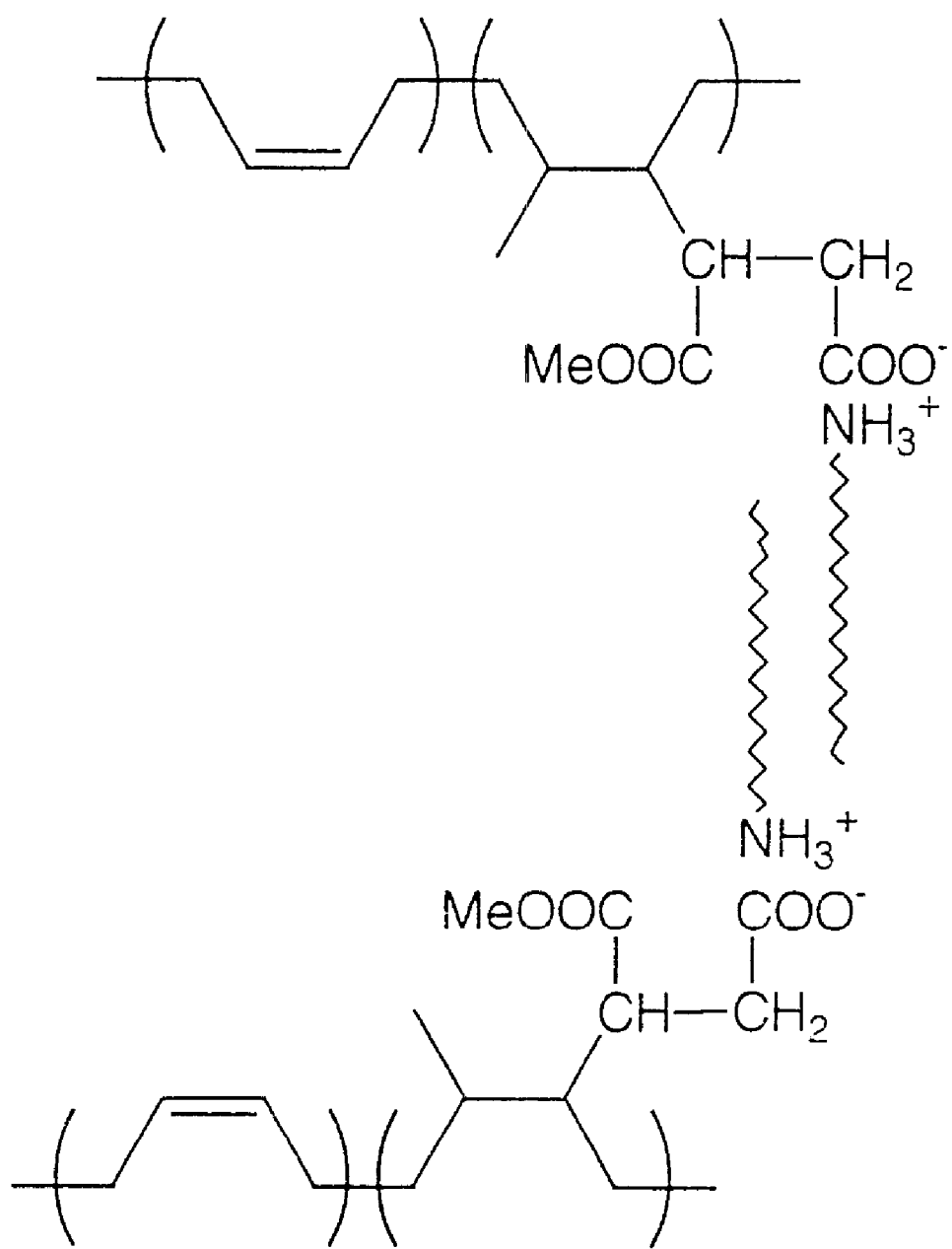
FIG. 19 is a schematic view showing a cross-link formed in an elastomer having an organic sale structure in its side-chain, which includes carboxylic acid-modified liquid isoprene rubber and stearylamine.

It is conceived that these excellent properties of rubber compositions according to the present invention are brought about by forming cross-links between molecules of elastomers having an organic salt structure in a side-chain thereof, between molecules of solid rubber, and between molecules of an elastomer and solid rubber (FIGS. 18 and 19).

The advantages described below are obtained from the first embodiment of an elastomer according to the present invention.

The elastomer has high heat resistance, and low cold-flowability. Since the elastomer has high flowability over 100° C., and has tendency to be extremely soft with temperatures, the elastomer may advantageously be recycled. Therefore, by mixing the elastomer according to the present invention to various thermoplastic elastomers or hotmelt adhesives, such elastomers or adhesives may have excellent physical properties, such as heat resistance, while a resultant mixture maintains a soft state at room temperature, quick stop of flow after the mixture is extruded, capability of being nearly perpetually recycled may advantageously be provided to the mixture.

Moreover, an elastomer composition for adhesives including the elastomer according to the present invention is excellent in heat resistance.

The advantages described below are obtained from the second embodiment of an elastomer according to the present invention.

The elastomer according to the present invention has high heat resistance, low cold-flowability, and easy recyclability. Moreover, an elastomer composition according to the present invention provides excellent anti-flowability (cold-flow prevention) to resin, or rubber when the elastomer composition is mixed to the resin or the rubber. By mixing the elastomer composition to hotmelt adhesives or thermoplastic elastomers, excellent heat resistance may advantageously be provided to the hotmelt adhesives. Such elastomer composition according to the present invention may advantageously be used as a flow prevention agent, and a heat resistance provider.

The advantages described below are obtained from the third embodiment of a thermoplastic elastomer according to the present invention.

The thermoplastic elastomer according to the present invention may be transformed to a rubber-like elastic solid by forming a hydrogen bond, which is maintained up to a high temperature. This causes the thermoplastic elastomer to exhibit good rubber characteristics, such as excellent heat resistance, and cold-flow prevention. These characteristics are good enough for the thermoplastic elastomer to be put in a practical use. When the thermoplastic elastomer according to the present invention is heated to over the temperature the thermoplastic elastomer may endure, the thermoplastic elastomer shows an extremely high flowability by cleaving a cross-link. This causes the thermoplastic elastomer to have good processability and recyclability when molded. Moreover, such thermoplastic elastomer is not necessary to include a thermoplastic resin as a hard segment, such that the thermoplastic elastomer may advantageously exhibit as good characteristics inherent to elastomers as a conventional thermoplastic elastomer exhibits.

The advantages described below are obtained from the fourth embodiment of an elastomer according to the present invention.

The elastomer according to the present invention has higher heat resistance and lower cold-flowability compared with a conventional elastomer. Moreover, the elastomer according to the present invention may reversibly repeat many times flowing caused by cleaving a cross-link, and gelling caused by forming a cross-link. In other words, the elastomer may be recycled. Therefore, when the elastomer is blended into hotmelt adhesives, the elastomer may enhance recyclability, processability, and the like of such adhesives.

Furthermore, when the elastomer is blended to resin or rubber, which shows a cold-flow phenomenon at room temperature, the phenomenon may advantageously be prevented. Therefore, the elastomer according to the present invention may advantageously be used as a modifier to prevent flow of resin or rubber such that the elastomer may be a useful modifier for adhesives.

The advantages described below are obtained from the fifth embodiment of a rubber composition according to the present invention.

The rubber composition according to the present invention has excellent processability and tensile strength when the composition is molded. The composition has also excellent physical properties, such as anti-abrasion, and the like, as well as a small loss tangent (tan $\delta$). Therefore, the composition is useful widely in various applications such as automobile tires, and the like.

It should be apparent to those skilled in the art that the present invention may be embodied in any other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An elastomer composition comprising an elastomer having a functional group and a compound having a functional group, wherein:

(1) a cross-link, which is formed by a hydrogen bond, is formed at around room temperature and cleaved reversibly between the functional group of the elastomer and the functional group of the compound at a temperature higher than room temperature by heating;

(2) the hydrogen bond is formed by a hydroxyl group, and/or a primary or a secondary amine group, and a tertiary amine group, and/or a carbonyl group; and (3) in the elastomer composition the mixing ratio of the compound is 0.1–5 equivalent weights with respect to 1 equivalent weight of a reactive portion in the elastomer capable of forming the hydrogen bond.

2. An elastomer composition comprising an elastomer having a functional group and a compound having a functional group, wherein:
(1) a cross-link, which is formed by an interaction with an organic salt, is formed at around room temperature and cleaved reversibly at a temperature higher than room temperature by heating;
(2) the organic salt is an onium salt, which is formed by a cation selected from the group consisting of ammonium, phosphonium, oxonium, sulfonium and idonium ions, and an anion selected from the group consisting of halide, carboxylate, alcoholate, phenolate, thiocarboxylate and sulfonate ions; and
(3) in the elastomer composition the mixing ratio of the elastomer and the compound is 0.1–5 equivalent weights of a reactive moiety in the compound capable of forming an ionic bond with respect to 1 equivalent weight of a reactive moiety in the elastomer capable of forming an ionic bond.

3. The elastomer composition as set forth in claim 2, wherein said onium salt is a salt including a hydrocarbon group.

4. The elastomer composition as set forth in claim 2, wherein said onium salt is present in a side-chain of the elastomer.

5. An elastomer composition comprising an elastomer having a functional group and a compound having a functional group, wherein:
(1) a cross-link, which is formed by a Diels-Alder reaction, is formed at around room temperature and cleaved reversibly at a temperature higher than room temperature by heating;
(2) the elastomer is an elastomer having an olefin structure in a main chain and a furan moiety and/or a maleimide structure in a side chain, and the compound is a compound having at least two maleimide structures and/or furan moieties; and
(3) in the elastomer composition the mixing ratio of the elastomer and the compound is such that a reactive moiety of the compound is 0.01 to 1.5 equivalent weights with respect to 1 equivalent weight of a reactive moiety of the elastomer.

6. An elastomer composition comprising an elastomer having at least two functional groups in a molecule, said functional groups forming a cross-link by a hydrogen bond within a molecule, which is formed by a hydroxyl group and/or a primary, or a secondary amine group and a tertiary amine group, and/or a carbonyl group, said cross-link being formed at around room temperature and cleaved reversibly at a temperature higher than room temperature by heating.

7. The elastomer composition as set forth in claim 6, wherein said cross-link is formed by said carbonyl group and a heterocyclic amine group.

8. The elastomer composition as set forth in claim 7, wherein said carbonyl group is at least one member selected from the group consisting of amides, esters, imides, and carboxylic acids.

9. The elastomer composition as set forth in claim 8, wherein said carbonyl group is at least one member selected from the group consisting of the following formulas:

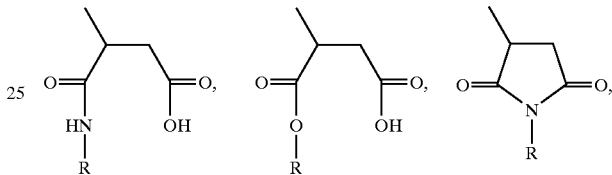

wherein R is a heterocyclic amine.

10. An elastomer composition, which comprises the elastomer composition of any one of claims 1, 2, 5, and 6, and solid rubber.

11. An elastomer composition for a tire application, which comprises the elastomer composition of any one of claims 1, 2, 5, and 6, and solid rubber.

12. An elastomer composition for an adhesive application, which comprises the elastomer composition of any one of claims 1, 2, 5, and 6.

* * * * *